United States Patent
Kelly et al.

(10) Patent No.: US 10,387,834 B2
(45) Date of Patent: Aug. 20, 2019

(54) SYSTEMS AND METHODS FOR ACCESSING AND STORING SNAPSHOTS OF A REMOTE APPLICATION IN A DOCUMENT

(71) Applicant: PALANTIR TECHNOLOGIES INC., Palo Alto, CA (US)

(72) Inventors: Sean Kelly, McLean, VA (US); Mike Kattouf, Arlington, VA (US); Asa Martin, Vienna, VA (US); James Shuster, Arlington, VA (US); Andrew Sheh, McLean, VA (US); Elston Tochip, Arlington, VA (US); Paul Thoren, Arlington, VA (US)

(73) Assignee: Palantir Technologies Inc., Palo Alto, CA (US)

( * ) Notice: Subject to any disclaimer, the term of this patent is extended or adjusted under 35 U.S.C. 154(b) by 123 days.

(21) Appl. No.: 14/601,735

(22) Filed: Jan. 21, 2015

(65) Prior Publication Data

US 2016/0210270 A1    Jul. 21, 2016

(51) Int. Cl.
    *G06F 17/10*    (2006.01)
    *G06Q 10/10*    (2012.01)

(52) U.S. Cl.
    CPC .................... *G06Q 10/10* (2013.01)

(58) Field of Classification Search
    CPC ................ G06F 3/048; G06Q 10/10
    See application file for complete search history.

(56) References Cited

U.S. PATENT DOCUMENTS

| 5,109,399 A | 4/1992 | Thompson |
| 5,329,108 A | 7/1994 | Lamoure |

(Continued)

FOREIGN PATENT DOCUMENTS

| DE | 102014103482 | 9/2014 |
| EP | 1672527 | 6/2006 |

(Continued)

OTHER PUBLICATIONS

"A First Look: Predicting Market Demand for Food Retail using a Huff Analysis," TRF Policy Solutions, Jul. 2012, pp. 30.

(Continued)

*Primary Examiner* — Shahid K Khan
(74) *Attorney, Agent, or Firm* — Schwegman Lundberg & Woessner, P.A.

(57) ABSTRACT

Computer-implemented systems and methods are disclosed to interface with a storage device storing a file, wherein the file comprises first data associated with an artifact configured to be displayed in a first interface at a first electronic device, the artifact including a first representation state representing a first visual depiction of one or more data objects. In accordance with some embodiments, a method is provided to provide access via the first interface to the one or more data objects. The method comprises acquiring the first data associated with artifact. The method further comprises acquiring an activation of at least part of the artifact, and responsive to acquiring the activation, transmitting a first request to a second electronic device for second data associated with the artifact. The method further comprises acquiring the second data, wherein the second data allows the first visual depiction to be altered to a second visual depiction.

20 Claims, 14 Drawing Sheets

(56) References Cited

U.S. PATENT DOCUMENTS

| | | | |
|---|---|---|---|
| 5,632,987 | A | 5/1997 | Rao et al. |
| 5,670,987 | A | 9/1997 | Doi et al. |
| 5,781,704 | A | 7/1998 | Rossmo |
| 5,845,300 | A | 12/1998 | Comer |
| 6,057,757 | A | 5/2000 | Arrowsmith et al. |
| 6,091,956 | A | 7/2000 | Hollenberg |
| 6,161,098 | A | 12/2000 | Wallman |
| 6,219,053 | B1 | 4/2001 | Tachibana et al. |
| 6,232,971 | B1 | 5/2001 | Haynes |
| 6,247,019 | B1 | 6/2001 | Davies |
| 6,279,018 | B1 | 8/2001 | Kudrolli et al. |
| 6,341,310 | B1 | 1/2002 | Leshem et al. |
| 6,366,933 | B1 | 4/2002 | Ball et al. |
| 6,369,835 | B1 | 4/2002 | Lin |
| 6,456,997 | B1 | 9/2002 | Shukla |
| 6,549,944 | B1 | 4/2003 | Weinberg et al. |
| 6,560,620 | B1 | 5/2003 | Ching |
| 6,581,068 | B1 | 6/2003 | Bensoussan et al. |
| 6,594,672 | B1 | 7/2003 | Lampson et al. |
| 6,631,496 | B1 | 10/2003 | Li et al. |
| 6,642,945 | B1 | 11/2003 | Sharpe |
| 6,714,936 | B1 * | 3/2004 | Nevin, III .............. G06T 11/20 |
| 6,775,675 | B1 | 8/2004 | Nwabueze et al. |
| 6,828,920 | B2 | 12/2004 | Owen et al. |
| 6,839,745 | B1 | 1/2005 | Dingari et al. |
| 6,877,137 | B1 | 4/2005 | Rivette et al. |
| 6,976,210 | B1 | 12/2005 | Silva et al. |
| 6,980,984 | B1 | 12/2005 | Huffman et al. |
| 6,985,950 | B1 | 1/2006 | Hanson et al. |
| 7,036,085 | B2 | 4/2006 | Barros |
| 7,043,702 | B2 | 5/2006 | Chi et al. |
| 7,051,039 | B1 * | 5/2006 | Murthy .............. G06F 21/6227 |
| 7,055,110 | B2 | 5/2006 | Kupka et al. |
| 7,139,800 | B2 | 11/2006 | Bellotti et al. |
| 7,158,878 | B2 | 1/2007 | Rasmussen et al. |
| 7,162,475 | B2 | 1/2007 | Ackerman |
| 7,168,039 | B2 | 1/2007 | Bertram |
| 7,171,427 | B2 | 1/2007 | Witkowski |
| 7,269,786 | B1 | 9/2007 | Malloy et al. |
| 7,278,105 | B1 | 10/2007 | Kitts |
| 7,290,698 | B2 | 11/2007 | Poslinski et al. |
| 7,333,998 | B2 | 2/2008 | Heckerman et al. |
| 7,370,047 | B2 | 5/2008 | Gorman |
| 7,379,811 | B2 | 5/2008 | Rasmussen et al. |
| 7,379,903 | B2 | 5/2008 | Joseph |
| 7,426,654 | B2 | 9/2008 | Adams et al. |
| 7,454,466 | B2 | 11/2008 | Bellotti et al. |
| 7,467,375 | B2 | 12/2008 | Tondreau et al. |
| 7,487,139 | B2 | 2/2009 | Fraleigh et al. |
| 7,502,786 | B2 | 3/2009 | Liu et al. |
| 7,525,422 | B2 | 4/2009 | Bishop et al. |
| 7,529,727 | B2 | 5/2009 | Arning et al. |
| 7,558,677 | B2 | 6/2009 | Jones |
| 7,574,428 | B2 | 8/2009 | Leiserowitz et al. |
| 7,579,965 | B2 | 8/2009 | Bucholz |
| 7,596,285 | B2 | 9/2009 | Brown et al. |
| 7,614,006 | B2 | 11/2009 | Molander |
| 7,617,232 | B2 | 11/2009 | Gabbert et al. |
| 7,620,628 | B2 | 11/2009 | Kapur et al. |
| 7,627,812 | B2 | 12/2009 | Chamberlain et al. |
| 7,634,717 | B2 | 12/2009 | Chamberlain et al. |
| 7,703,021 | B1 | 4/2010 | Flam |
| 7,712,049 | B2 | 5/2010 | Williams et al. |
| 7,716,077 | B1 | 5/2010 | Mikurak |
| 7,725,530 | B2 | 5/2010 | Sah et al. |
| 7,725,547 | B2 | 5/2010 | Albertson et al. |
| 7,730,082 | B2 | 6/2010 | Sah et al. |
| 7,730,109 | B2 | 6/2010 | Rohrs et al. |
| 7,770,100 | B2 | 8/2010 | Chamberlain et al. |
| 7,805,457 | B1 | 9/2010 | Viola et al. |
| 7,809,703 | B2 | 10/2010 | Balabhadrapatruni et al. |
| 7,818,658 | B2 | 10/2010 | Chen |
| 7,894,984 | B2 | 2/2011 | Rasmussen et al. |
| 7,899,611 | B2 | 3/2011 | Downs et al. |
| 7,917,376 | B2 | 3/2011 | Bellin et al. |
| 7,920,963 | B2 | 4/2011 | Jouline et al. |
| 7,933,862 | B2 | 4/2011 | Chamberlain et al. |
| 7,962,281 | B2 | 6/2011 | Rasmussen et al. |
| 7,962,848 | B2 | 6/2011 | Bertram |
| 7,970,240 | B1 | 6/2011 | Chao et al. |
| 7,971,150 | B2 | 6/2011 | Raskutti et al. |
| 7,984,374 | B2 | 6/2011 | Caro et al. |
| 8,001,465 | B2 | 8/2011 | Kudrolli et al. |
| 8,001,482 | B2 | 8/2011 | Bhattiprolu et al. |
| 8,010,545 | B2 | 8/2011 | Stefik et al. |
| 8,015,487 | B2 | 9/2011 | Roy et al. |
| 8,024,778 | B2 | 9/2011 | Cash et al. |
| 8,036,632 | B1 | 10/2011 | Cona et al. |
| 8,103,543 | B1 | 1/2012 | Zwicky |
| 8,134,457 | B2 | 3/2012 | Velipasalar et al. |
| 8,145,703 | B2 | 3/2012 | Frishert et al. |
| 8,185,819 | B2 | 5/2012 | Sah et al. |
| 8,214,361 | B1 | 7/2012 | Sandler et al. |
| 8,214,764 | B2 | 7/2012 | Gemmell et al. |
| 8,225,201 | B2 | 7/2012 | Michael |
| 8,229,947 | B2 | 7/2012 | Fujinaga |
| 8,230,333 | B2 | 7/2012 | Decherd et al. |
| 8,280,880 | B1 | 10/2012 | Aymeloglu et al. |
| 8,290,942 | B2 | 10/2012 | Jones et al. |
| 8,301,464 | B1 | 10/2012 | Cave et al. |
| 8,301,904 | B1 | 10/2012 | Gryaznov |
| 8,312,367 | B2 | 11/2012 | Foster |
| 8,312,546 | B2 | 11/2012 | Alme |
| 8,352,881 | B2 | 1/2013 | Champion et al. |
| 8,368,695 | B2 | 2/2013 | Howell et al. |
| 8,397,171 | B2 | 3/2013 | Klassen et al. |
| 8,412,707 | B1 | 4/2013 | Mianji |
| 8,447,722 | B1 | 5/2013 | Ahuja et al. |
| 8,452,790 | B1 | 5/2013 | Mianji |
| 8,463,036 | B1 | 6/2013 | Ramesh et al. |
| 8,489,331 | B2 | 7/2013 | Kopf et al. |
| 8,489,641 | B1 | 7/2013 | Seefeld et al. |
| 8,494,984 | B2 | 7/2013 | Hwang et al. |
| 8,514,082 | B2 | 8/2013 | Cova et al. |
| 8,515,207 | B2 | 8/2013 | Chau |
| 8,554,579 | B2 | 10/2013 | Tribble et al. |
| 8,554,709 | B2 | 10/2013 | Goodson et al. |
| 8,577,911 | B1 | 11/2013 | Stepinski et al. |
| 8,589,273 | B2 | 11/2013 | Creeden et al. |
| 8,620,641 | B2 | 12/2013 | Farnsworth et al. |
| 8,646,080 | B2 | 2/2014 | Williamson et al. |
| 8,689,108 | B1 | 4/2014 | Duffield et al. |
| 8,713,467 | B1 | 4/2014 | Goldenberg et al. |
| 8,726,379 | B1 | 5/2014 | Stiansen et al. |
| 8,739,278 | B2 | 5/2014 | Varghese |
| 8,799,799 | B1 | 5/2014 | Cervelli et al. |
| 8,742,934 | B1 | 6/2014 | Sarpy et al. |
| 8,745,516 | B2 | 6/2014 | Mason et al. |
| 8,781,169 | B2 | 7/2014 | Jackson et al. |
| 8,812,960 | B1 | 8/2014 | Sun et al. |
| 8,830,322 | B2 | 9/2014 | Nerayoff et al. |
| 8,832,594 | B1 | 9/2014 | Thompson et al. |
| 8,868,537 | B1 | 10/2014 | Colgrove et al. |
| 8,917,274 | B2 | 12/2014 | Ma et al. |
| 8,924,872 | B1 | 12/2014 | Bogomolov et al. |
| 2002/0033848 | A1 | 3/2002 | Sciammarella et al. |
| 2002/0091707 | A1 | 7/2002 | Keller |
| 2002/0095658 | A1 | 7/2002 | Shulman |
| 2002/0116120 | A1 | 8/2002 | Ruiz et al. |
| 2002/0145620 | A1 * | 10/2002 | Smith .............. G06F 16/29 715/712 |
| 2002/0174201 | A1 | 11/2002 | Ramer et al. |
| 2003/0028560 | A1 | 2/2003 | Kudrolli et al. |
| 2003/0039948 | A1 | 2/2003 | Donahue |
| 2003/0144868 | A1 | 7/2003 | MacIntyre et al. |
| 2003/0163352 | A1 | 8/2003 | Surpin et al. |
| 2003/0225755 | A1 | 12/2003 | Iwayama et al. |
| 2003/0229848 | A1 | 12/2003 | Arend et al. |
| 2004/0032432 | A1 | 2/2004 | Baynger |
| 2004/0064256 | A1 | 4/2004 | Barinek et al. |
| 2004/0085318 | A1 | 5/2004 | Hassler et al. |
| 2004/0095349 | A1 | 5/2004 | Bito et al. |
| 2004/0143602 | A1 | 7/2004 | Ruiz et al. |
| 2004/0163039 | A1 | 8/2004 | McPherson et al. |

(56) References Cited

U.S. PATENT DOCUMENTS

| | | |
|---|---|---|
| 2004/0193600 A1 | 9/2004 | Kaasten et al. |
| 2004/0260702 A1 | 12/2004 | Cragun et al. |
| 2005/0027705 A1 | 2/2005 | Sadri et al. |
| 2005/0028094 A1 | 2/2005 | Allyn |
| 2005/0080769 A1 | 4/2005 | Gemmell |
| 2005/0086207 A1 | 4/2005 | Heuer et al. |
| 2005/0125715 A1 | 6/2005 | Franco et al. |
| 2005/0162523 A1 | 7/2005 | Darrell et al. |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0246327 A1 | 11/2005 | Yeung et al. |
| 2005/0251786 A1 | 11/2005 | Citron et al. |
| 2006/0026120 A1 | 2/2006 | Carolan et al. |
| 2006/0026170 A1 | 2/2006 | Kreitler et al. |
| 2006/0059139 A1 | 3/2006 | Robinson |
| 2006/0080619 A1 | 4/2006 | Carlson et al. |
| 2006/0129746 A1 | 6/2006 | Porter |
| 2006/0139375 A1 | 6/2006 | Rasmussen et al. |
| 2006/0149596 A1 | 7/2006 | Surpin et al. |
| 2006/0203337 A1 | 9/2006 | White |
| 2006/0218637 A1 | 9/2006 | Thomas et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0271277 A1 | 11/2006 | Hu et al. |
| 2006/0279630 A1 | 12/2006 | Aggarwal et al. |
| 2007/0011150 A1 | 1/2007 | Frank |
| 2007/0016363 A1 | 1/2007 | Huang et al. |
| 2007/0038962 A1 | 2/2007 | Fuchs et al. |
| 2007/0057966 A1 | 3/2007 | Ohno et al. |
| 2007/0078832 A1 | 4/2007 | Ott et al. |
| 2007/0083541 A1 | 4/2007 | Fraleigh et al. |
| 2007/0174760 A1 | 7/2007 | Chamberlain et al. |
| 2007/0192265 A1 | 8/2007 | Chopin et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0266336 A1 | 11/2007 | Nojima et al. |
| 2007/0294643 A1 | 12/2007 | Kyle |
| 2008/0040684 A1 | 2/2008 | Crump |
| 2008/0051989 A1 | 2/2008 | Welsh |
| 2008/0052142 A1 | 2/2008 | Bailey et al. |
| 2008/0077597 A1 | 3/2008 | Butler |
| 2008/0077642 A1 | 3/2008 | Carbone et al. |
| 2008/0104019 A1 | 5/2008 | Nath |
| 2008/0126951 A1 | 5/2008 | Sood et al. |
| 2008/0162616 A1 | 7/2008 | Gross et al. |
| 2008/0195417 A1 | 8/2008 | Surpin et al. |
| 2008/0195608 A1 | 8/2008 | Clover |
| 2008/0222295 A1 | 9/2008 | Robinson et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0301643 A1 | 12/2008 | Appleton et al. |
| 2009/0002492 A1 | 1/2009 | Velipasalar et al. |
| 2009/0027418 A1 | 1/2009 | Maru et al. |
| 2009/0030915 A1 | 1/2009 | Winter et al. |
| 2009/0055251 A1 | 2/2009 | Shah et al. |
| 2009/0088964 A1 | 4/2009 | Schaaf et al. |
| 2009/0112910 A1* | 4/2009 | Picault ............ G06Q 30/02 |
| 2009/0119309 A1 | 5/2009 | Gibson et al. |
| 2009/0125369 A1 | 5/2009 | Kloostra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0144262 A1 | 6/2009 | White et al. |
| 2009/0144274 A1 | 6/2009 | Fraleigh et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0177962 A1 | 7/2009 | Gusmorino et al. |
| 2009/0179892 A1 | 7/2009 | Tsuda et al. |
| 2009/0222400 A1 | 9/2009 | Kupershmidt et al. |
| 2009/0222760 A1 | 9/2009 | Halverson et al. |
| 2009/0234720 A1 | 9/2009 | George et al. |
| 2009/0249244 A1 | 10/2009 | Robinson et al. |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2010/0011282 A1 | 1/2010 | Dollard et al. |
| 2010/0042922 A1 | 2/2010 | Bradateanu et al. |
| 2010/0057716 A1 | 3/2010 | Stefik et al. |
| 2010/0070523 A1 | 3/2010 | Delgo et al. |
| 2010/0070842 A1 | 3/2010 | Aymeloglu et al. |
| 2010/0070897 A1 | 3/2010 | Aymeloglu et al. |
| 2010/0100963 A1 | 4/2010 | Mahaffey |
| 2010/0103124 A1 | 4/2010 | Kruzeniski et al. |
| 2010/0114887 A1 | 5/2010 | Conway et al. |
| 2010/0122152 A1 | 5/2010 | Chamberlain et al. |
| 2010/0131457 A1 | 5/2010 | Heimendinger |
| 2010/0162176 A1 | 6/2010 | Dunton |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0250412 A1 | 9/2010 | Wagner |
| 2010/0280857 A1 | 11/2010 | Liu et al. |
| 2010/0293174 A1 | 11/2010 | Bennett et al. |
| 2010/0306713 A1 | 12/2010 | Geisner et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0047159 A1 | 2/2011 | Baid et al. |
| 2011/0060753 A1 | 3/2011 | Shaked et al. |
| 2011/0061013 A1 | 3/2011 | Bilicki et al. |
| 2011/0074811 A1 | 3/2011 | Hanson et al. |
| 2011/0078173 A1 | 3/2011 | Seligmann et al. |
| 2011/0117878 A1 | 5/2011 | Barash et al. |
| 2011/0119100 A1 | 5/2011 | Ruhl et al. |
| 2011/0137766 A1 | 6/2011 | Rasmussen et al. |
| 2011/0153384 A1 | 6/2011 | Horne et al. |
| 2011/0161096 A1 | 6/2011 | Buehler et al. |
| 2011/0167710 A1 | 7/2011 | Ramakrishnan et al. |
| 2011/0170799 A1 | 7/2011 | Carrino et al. |
| 2011/0173032 A1 | 7/2011 | Payne et al. |
| 2011/0208724 A1 | 8/2011 | Jones et al. |
| 2011/0218934 A1 | 9/2011 | Elser |
| 2011/0219450 A1 | 9/2011 | McDougal et al. |
| 2011/0225198 A1 | 9/2011 | Edwards et al. |
| 2011/0270705 A1 | 11/2011 | Parker |
| 2011/0291851 A1 | 12/2011 | Whisenant |
| 2011/0310005 A1 | 12/2011 | Chen et al. |
| 2011/0314007 A1 | 12/2011 | Dassa et al. |
| 2012/0019559 A1 | 1/2012 | Siler et al. |
| 2012/0036013 A1 | 2/2012 | Neuhaus et al. |
| 2012/0036434 A1 | 2/2012 | Oberstein |
| 2012/0066296 A1 | 3/2012 | Appleton et al. |
| 2012/0079363 A1 | 3/2012 | Folting et al. |
| 2012/0106801 A1 | 5/2012 | Jackson |
| 2012/0117082 A1 | 5/2012 | Koperda et al. |
| 2012/0131512 A1 | 5/2012 | Takeuchi et al. |
| 2012/0144335 A1 | 6/2012 | Abeln et al. |
| 2012/0159307 A1 | 6/2012 | Chung et al. |
| 2012/0159399 A1 | 6/2012 | Bastide et al. |
| 2012/0173985 A1 | 7/2012 | Peppel |
| 2012/0196557 A1 | 8/2012 | Reich et al. |
| 2012/0196558 A1 | 8/2012 | Reich et al. |
| 2012/0208636 A1 | 8/2012 | Feige |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0290879 A1 | 11/2012 | Shibuya et al. |
| 2012/0296907 A1 | 11/2012 | Long et al. |
| 2012/0323888 A1 | 12/2012 | Osann, Jr. |
| 2012/0330973 A1 | 12/2012 | Ghuneim et al. |
| 2013/0006725 A1 | 1/2013 | Simanek et al. |
| 2013/0046842 A1 | 2/2013 | Muntz et al. |

(56) References Cited

U.S. PATENT DOCUMENTS

| | | |
|---|---|---|
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0078943 A1 | 3/2013 | Biage et al. |
| 2013/0097482 A1 | 4/2013 | Marantz et al. |
| 2013/0111320 A1 | 5/2013 | Campbell et al. |
| 2013/0117651 A1 | 5/2013 | Waldman et al. |
| 2013/0101159 A1 | 6/2013 | Rosen |
| 2013/0150004 A1 | 6/2013 | Rosen |
| 2013/0157234 A1 | 6/2013 | Gulli et al. |
| 2013/0176321 A1 | 7/2013 | Mitchell et al. |
| 2013/0179420 A1 | 7/2013 | Park et al. |
| 2013/0224696 A1 | 8/2013 | Wolfe et al. |
| 2013/0238616 A1 | 9/2013 | Rose et al. |
| 2013/0246170 A1 | 9/2013 | Gross et al. |
| 2013/0251233 A1 | 9/2013 | Yang et al. |
| 2013/0262527 A1 | 10/2013 | Hunter et al. |
| 2013/0263019 A1 | 10/2013 | Castellanos et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandarsekaran et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047357 A1 | 2/2014 | Alfaro et al. |
| 2014/0059038 A1 | 2/2014 | McPherson et al. |
| 2014/0068487 A1 | 3/2014 | Steiger et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0267294 A1 | 9/2014 | Ma |
| 2014/0267295 A1 | 9/2014 | Sharma |
| 2014/0279824 A1 | 9/2014 | Tamayo |
| 2014/0316911 A1 | 10/2014 | Gross |
| 2014/0333651 A1 | 11/2014 | Cervelli et al. |
| 2014/0337772 A1 | 11/2014 | Cervelli et al. |

FOREIGN PATENT DOCUMENTS

| | | |
|---|---|---|
| EP | 2551799 | 1/2013 |
| EP | 2778977 | 9/2014 |
| GB | 2516155 | 1/2015 |
| NZ | 624557 | 12/2014 |
| WO | WO 2000/009529 | 2/2000 |
| WO | WO 2005/104736 | 11/2005 |
| WO | WO 2009/061501 | 5/2009 |
| WO | WO 2010/000014 | 1/2010 |
| WO | WO 2010/030913 | 3/2010 |

OTHER PUBLICATIONS

"A Quick Guide to UniProtKB Swiss-Prot & TrEMBL," Sep. 2011, pp. 2.
Acklen, Laura, "Absolute Beginner's Guide to Microsoft Word 2003," Dec. 24, 2003, pp. 15-18, 34-41, 308-316.
Ananiev et al., "The New Modality API," http://web.archive.org/web/20061211011958/http://java.sun.com/developer/technicalArticles/J2SE/Desktop/javase6/modality/ Jan. 21, 2006, pp. 8.
Bluttman et al., "Excel Formulas and Functions for Dummies," 2005, Wiley Publishing, Inc., pp. 280, 284-286.
Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.
Canese et al., "Chapter 2: PubMed: The Bibliographic Database," The NCBI Handbook, Oct. 2002, pp. 1-10.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Conner, Nancy, "Google Apps: The Missing Manual," May 1, 2008, pp. 15.
Delcher et al., "Identifying Bacterial Genes and Endosymbiont DNA with Glimmer," BioInformatics, vol. 23, No. 6, 2007, pp. 673-679.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model1/123411.
GIS-NET 3 Public—Department of Regional Planning. Planning & Zoning Information for Unincorporated LA County. Retrieved Oct. 2, 2013 from http://gis.planning.lacounty.gov/GIS-NET3_Public/Viewer.html.
Goswami, Gautam, "Quite Writly Said!," One Brick at a Time, Aug. 21, 2005, pp. 7.
Griffith, Daniel A., "A Generalized Huff Model," Geographical Analysis, Apr. 1982, vol. 14, No. 2, pp. 135-144.
Hansen et al. "Analyzing Social Media Networks with NodeXL: Insights from a Connected World", Chapter 4, pp. 53-67 and Chapter 10, pp. 143-164, published Sep. 2010.
Hibbert et al., "Prediction of Shopping Behavior Using a Huff Model Within a GIS Framework," Healthy Eating in Context, Mar. 18, 2011, pp. 16.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
Kahan et al., "Annotea: an open RDF infrastructure for shared WEB annotations", Computer Networks 39, pp. 589-608, 2002.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kitts, Paul, "Chapter 14: Genome Assembly and Annotation Process," The NCBI Handbook, Oct. 2002, pp. 1-21.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Manske, "File Saving Dialogs," <http://www.mozilla.org/editor/ui_specs/FileSaveDialogs.html>, Jan. 20, 1999, pp. 7.
Map of San Jose, CA. Retrieved Oct. 2, 2013 from http://maps.bing.com.
Map of San Jose, CA. Retrieved Oct. 2, 2013 from http://maps.google.com.
Map of San Jose, CA. Retrieved Oct. 2, 2013 from http://maps.yahoo.com.
Microsoft—Developer Network, "Getting Started with VBA in Word 2010," Apr. 2010, <http://msdn.microsoft.com/en-us/library/ff604039%28v=office.14%29.aspx> as printed Apr. 4, 2014 in 17 pages.
Microsoft Office—Visio, "About connecting shapes," <http://office.microsoft.com/en-us/visio-help/about-connecting-shapes-HP085050369.aspx> printed Aug. 4, 2011 in 6 pages.

(56) References Cited

OTHER PUBLICATIONS

Microsoft Office—Visio, "Add and glue connectors with the Connector tool," <http://office.microsoft.com/en-us/visio-help/add-and-glue-connectors-with-the-connector-tool-HA010048532.aspx?CTT=1> printed Aug. 4, 2011 in 1 page.
Mizrachi, Ilene, "Chapter 1: GenBank: The Nuckeotide Sequence Database," The NCBI Handbook, Oct. 2002, pp. 1-14.
Nierman, "Evaluating Structural Similarity in XML Documents," 2002, 6 pages.
Palmas et al., "An Edge-Bunding Layout for Interactive Parallel Coordinates" 2014 IEEE Pacific Visualization Symposium, pp. 57-64.
Rouse, Margaret, "OLAP Cube," <http://searchdatamanagement.techtarget.com/definition/OLAP-cube>, Apr. 28, 2012, pp. 16.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
"The FASTA Program Package," fasta-36.3.4, Mar. 25, 2011, pp. 29.
Yang et al., "HTML Page Analysis Based on Visual Cues," 2001, pp. 859-864.
Issue Notification for U.S. Appl. No. 13/917,571 dated Aug. 5, 2014.
Notice of Allowance for U.S. Appl. No. 14/102,394 dated Aug. 25, 2014.
Notice of Allowance for U.S. Appl. No. 14/108,187 dated Aug. 29, 2014.
Notice of Allowance for U.S. Appl. No. 14/135,289 dated Oct. 14, 2014.
Notice of Allowance for U.S. Appl. No. 14/268,964 dated Dec. 3, 2014.
Notice of Allowance for U.S. Appl. No. 14/473,860 dated Jan. 5, 2015.
Notice of Allowance for U.S. Appl. No. 14/192,767 dated Dec. 16, 2014.
Notice of Allowance for U.S. Appl. No. 14/294,098 dated Dec. 29, 2014.
Official Communication for New Zealand Patent Application No. 624557 dated May 14, 2014.
Official Communication for New Zealand Patent Application No. 628585 dated Aug. 26, 2014.
Official Communication for European Patent Application No. 14158861.6 dated Jun. 16, 2014.
Official Communication for New Zealand Patent Application No. 622517 dated Apr. 3, 2014.
Official Communication for New Zealand Patent Application No. 628263 dated Aug. 12, 2014.
Official Communication for Great Britain Patent Application No. 1404457.2 dated Aug. 14, 2014.
Official Communication for New Zealand Patent Application No. 627962 dated Aug. 5, 2014.
Official Communication for European Patent Application No. 14159464.8 dated Jul. 31, 2014.
Official Communication for European Patent Application No. 14159464.8 dated Aug. 20, 2014.
Official Communication for European Patent Application No. 14159464.8 dated Sep. 22, 2014.
Official Communication for New Zealand Patent Application No. 628840 dated Aug. 28, 2014.
Official Communication in New Zealand Patent Application No. 628495 dated Aug. 19, 2014.
Official Communication for Great Britain Patent Application No. 1408025.3 dated Nov. 6, 2014.
Official Communication for New Zealand Patent Application No. 622513 dated Apr. 3, 2014.
Official Communication for New Zealand Patent Application No. 628161 dated Aug. 25, 2014.
Official Communication for Great Britain Patent Application No. 1404574.4 dated Dec. 18, 2014.
Official Communication for Great Britain Patent Application No. 1411984.6 dated Dec. 22, 2014.
Official Communication for U.S. Appl. No. 14/289,596 dated Jul. 18, 2014.
Official Communication for U.S. Appl. No. 14/289,599 dated Jul. 22, 2014.
Official Communication for U.S. Appl. No. 14/225,160 dated Jul. 29, 2014.
Official Communication for U.S. Appl. No. 14/268,964 dated Sep. 3, 2014.
Official Communication for U.S. Appl. No. 14/225,084 dated Sep. 2, 2014.
Official Communication for U.S. Appl. No. 14/294,098 dated Aug. 15, 2014.
Official Communication for U.S. Appl. No. 14/148,568 dated Oct. 22, 2014.
Official Communication for U.S. Appl. No. 14/225,006 dated Sep. 10, 2014.
Official Communication for U.S. Appl. No. 14/294,098 dated Nov. 6, 2014.
Official Communication for U.S. Appl. No. 14/306,138 dated Sep. 23, 2014.
Official Communication for U.S. Appl. No. 14/306,154 dated Sep. 9, 2014.
Official Communication for U.S. Appl. No. 14/306,147 dated Sep. 9, 2014.
Official Communication for U.S. Appl. No. 14/319,765 dated Nov. 25, 2014.
Official Communication for U.S. Appl. No. 14/323,935 dated Nov. 28, 2014.
Official Communication for U.S. Appl. No. 14/326,738 dated Dec. 2, 2014.
Official Communication for U.S. Appl. No. 14/225,160 dated Oct. 22, 2014.

\* cited by examiner

Data Object 363

| Object ID | Object Type |
|---|---|
| 123456 | Human |

| Property Type | Property Value | Access Control |
|---|---|---|
| Name | John | Display only |
| Profession | Terrorist | Inaccessible |
| Language | Japanese | Display/Edit |
| Birthplace | Chad | Display only |
| Organization Name | Mr. Assassins | Inaccessible |

FIG. 3B

SYSTEMS AND METHODS FOR ACCESSING AND STORING SNAPSHOTS OF A REMOTE APPLICATION IN A DOCUMENT

BACKGROUND

It is common to incorporate data objects into a document file. For example, Microsoft Word™ allows a user to include Microsoft Visio™ diagram objects into a document file, which allows the user to not only view the diagram objects as they appear in the document file, but also to invoke a Microsoft Visio™ editing environment to edit the diagram objects. Such an approach, however, has several shortcomings. For example, by storing the entirety of the data objects as part of the document file, the file size becomes very large, and the document file becomes less portable as more data objects are incorporated in the file. Also, if the document file is to be shared with other users, each having different access privileges to different data within the stored data object, it is difficult to set differentiating access policies for various data of the stored data objects in a single document file.

BRIEF DESCRIPTION OF THE DRAWINGS

Reference will now be made to the accompanying drawings showing example embodiments of the present application, and in which:

FIG. 3B is a chart illustrating an exemplary data object, consistent with embodiments of the present disclosure.

DETAILED DESCRIPTION OF EXEMPLARY EMBODIMENTS

Figure 1:
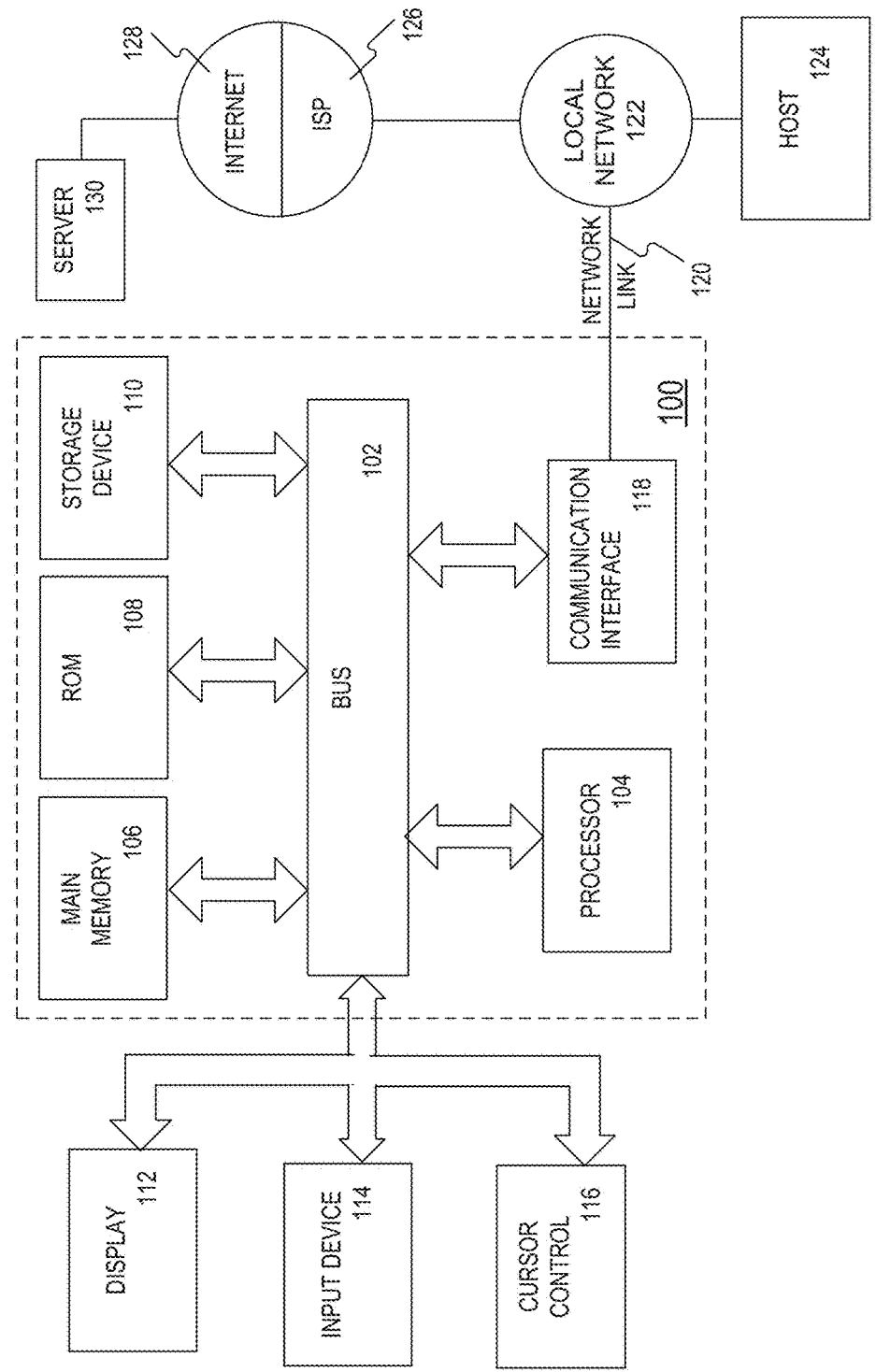
FIG. 1 is a block diagram of an exemplary computer system with which embodiments described herein can be implemented, consistent with embodiments of the present disclosure.

Reference will now be made in detail to the embodiments, the examples of which are illustrated in the accompanying drawings. Whenever possible, the same reference numbers will be used throughout the drawings to refer to the same or like parts.

Embodiments of the present disclosure provides a means to facilitate the incorporation and sharing of data via a document file, by allowing a user to access the data, not stored as part of the document file, while accessing the document file. As an exemplary illustration, the data is stored in a remote location separately from the document file. An interface can be provided to enable a user who accesses the document to also access the data stored in the remote location. Access control policy can be implemented as the data is being provided via the interface. Each user who accesses the data via the interface can also, depending on his or her access rights, update the data via the interface as viewed locally.

Embodiments of the present disclosure also provide a means to facilitate representation of the data. As an exemplary illustration, a state of representation of remotely stored data is stored as part of the document file. When a user opens the document file via an interface to access the remotely stored data, the data can be represented in the interface according to the stored state of representation. The user can also manipulate the representation of the data, and can choose to either overwrite the stored state, or to revert back to the previously-stored state.

The capability of storing a state of representation of the data, instead of the data itself, as part of the document, can allow the document file to be portable and easy to share. Such a capability also allows a user to interact with the data, which can facilitate efficient representation of the data. It also improves user experience when, for example, the data being represented is related to a content of the document file that the user is accessing. The separated access of data and their states of representation also provides easy management of access rights among each user with respect to various portions of the data presented in the document.

According to some embodiments, the operations, techniques, and/or components described herein can be implemented by an electronic device, which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that incorporates hard-wired and/or program logic to implement the techniques and other features of the present disclosure.

The one or more special-purpose computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Operating systems control and schedule computer processes for execution, perform memory management, provide file system, networking, I/O services, and provide a user interface functionality, such as a graphical user interface ("GUI"), among other things.

FIG. 1 is a block diagram of an exemplary computer system 100 with which embodiments described herein can be implemented, consistent with embodiments of the present disclosure. Computer system 100 includes a bus 102 or other communication mechanism for communicating information, and one or more hardware processors 104 (denoted as processor 104 for purposes of simplicity) coupled with bus 102 for processing information. Hardware processor 104 can be, for example, one or microprocessors.

Computer system 100 also includes a main memory 106, such as a random access memory (RAM) or other dynamic storage device, coupled to bus 102 for storing information and instructions to be executed by processor 104. Main memory 106 also can be used for storing temporary variables or other intermediate information during execution of instructions to be executed by processor 104. Such instructions, after being stored in non-transitory storage media accessible to processor 104, render computer system 100 into a special-purpose machine that is customized to perform the operations specified in the instructions.

Computer system 100 further includes a read only memory (ROM) 108 or other static storage device coupled to bus 102 for storing static information and instructions for processor 104. A storage device 110, such as a magnetic disk, optical disk, or USB thumb drive (Flash drive), etc., is provided and coupled to bus 102 for storing information and instructions.

Computer system 100 can be coupled via bus 102 to a display 112, such as a cathode ray tube (CRT), an liquid crystal display (LCD), or a touch screen, for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. The input device typically has two degrees of freedom in two axes, a first axis (for example, x) and a second axis (for example, y), that allows the device to specify positions in a plane. In some embodiments, the same direction information and command selections as cursor control can be implemented via receiving touches on a touch screen without a cursor.

Computing system 100 can include a user interface module to implement a graphical user interface (GUI) that can be stored in a mass storage device as executable software codes that are executed by the one or more computing devices. This and other modules can include, by way of example, components, such as software components, object-oriented software components, class components and task components, processes, functions, fields, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage.

Computer system 100 can implement the techniques described herein using customized hard-wired logic, one or more ASICs or FPGAs, firmware and/or program logic which in combination with the computer system causes or programs computer system 100 to be a special-purpose machine. According to some embodiments, the operations, functionalities, and techniques and other features described herein are performed by computer system 100 in response to processor 104 executing one or more sequences of one or more instructions contained in main memory 106. Such instructions can be read into main memory 106 from another storage medium, such as storage device 110. Execution of the sequences of instructions contained in main memory 106 causes processor 104 to perform the process steps described herein. In alternative embodiments, hard-wired circuitry can be used in place of or in combination with software instructions.

The term "non-transitory media" as used herein refers to any non-transitory media storing data and/or instructions that cause a machine to operate in a specific fashion. Such non-transitory media can comprise non-volatile media and/or volatile media. Non-volatile media can include, for example, optical or magnetic disks, such as storage device 110. Volatile media can include dynamic memory, such as main memory 106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, processor caches, registers, any other memory chip or cartridge, and networked versions of the same.

Non-transitory media is distinct from, but can be used in conjunction with, transmission media. Transmission media can participate in transferring information between storage media. For example, transmission media can include coaxial cables, copper wire and fiber optics, including the wires that comprise bus 102. Transmission media can also take the form of acoustic or light waves, such as those generated during radio-wave and infra-red data communications.

Various forms of media can be involved in carrying one or more sequences of one or more instructions to processor 104 for execution. For example, the instructions can initially be carried on a magnetic disk or solid state drive of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 can optionally be stored on storage device 110 either before or after execution by processor 104.

Computer system 100 can also include a communication interface 118 coupled to bus 102. Communication interface 118 can provide a two-way data communication coupling to a network link 120 that can be connected to a local network 122. For example, communication interface 118 can be an integrated services digital network (ISDN) card, cable modem, satellite modem, or a modem to provide a data communication connection to a corresponding type of telephone line. As another example, communication interface 118 can be a local area network (LAN) card to provide a data communication connection to a compatible LAN. Wireless links can also be implemented. In any such implementation, communication interface 118 can send and receive electrical, electromagnetic or optical signals that carry digital data streams representing various types of information.

Network link 120 can typically provide data communication through one or more networks to other data devices. For example, network link 120 can provide a connection through local network 122 to a host computer 124 or to data equipment operated by an Internet Service Provider (ISP) 126. ISP 126 in turn can provide data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, can be example forms of transmission media.

Computer system 100 can send messages and receive data, including program code, through the network(s), network link 120 and communication interface 118. In the Internet example, a server 130 can transmit a requested code for an application program through Internet 128, ISP 126, local network 122 and communication interface 118.

The received code can be executed by processor 104 as it is received, and/or stored in storage device 110, or other non-volatile storage for later execution. In some embodiments, server 130 can provide information for being displayed on a display.

Figure 2:
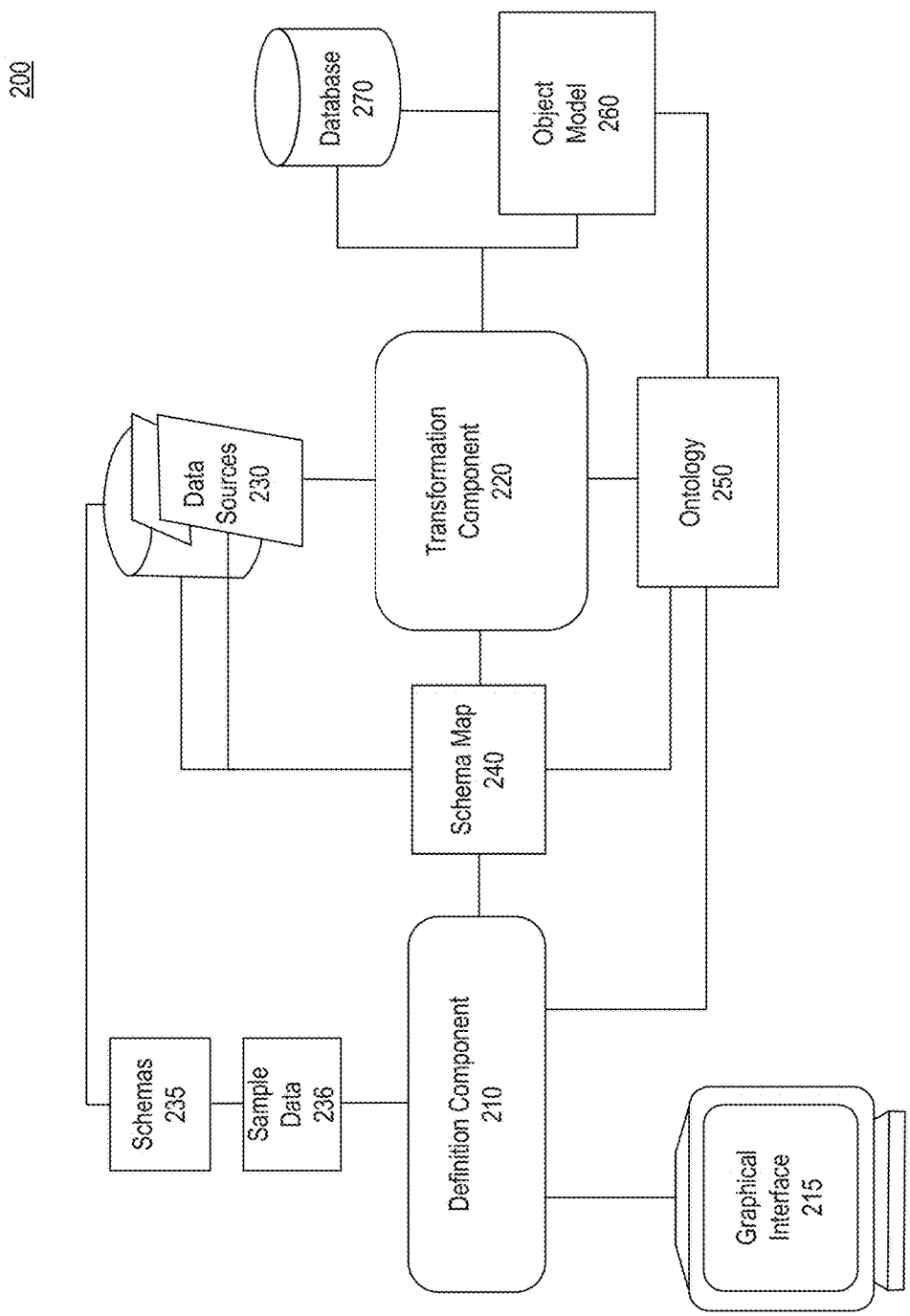
FIG. 2 is a block diagram depicting an exemplary internal database system, consistent with embodiments of the present disclosure.

FIG. 2 is a block diagram depicting an exemplary internal database system 200, consistent with embodiments of the present disclosure. Among other things, system 200 facilitates transformation of one or more data sources, such as data sources 230, into an object model 260, whose semantics are defined by an ontology 250. The transformation can be performed for a variety of reasons. For example, a database administrator can wish to import data from data sources 230 into a database 270 for persistently storing object model 260. As another example, a data presentation component (not depicted) can transform input data from data sources 230 "on the fly" into object model 260. Object model 260 can then be utilized, in conjunction with ontology 250, for analysis through graphs and/or other data visualization techniques.

System 200 comprises a definition component 210 and a transformation component 220, both implemented by one or more processors on one or more computing devices executing hardware and/or software-based logic for providing various functionality described herein. As will be appreciated from the present disclosure, system 200 can comprise fewer or additional components that provide various functionalities described herein. Such components are, for clarity, omitted from FIG. 1. Moreover, the component(s) of system 200 responsible for providing various functionalities can further vary from embodiment to embodiment.

Definition component 210 generates and/or modifies ontology 250 and a schema map 240. Exemplary embodiments for defining an ontology (such as ontology 250) is described in U.S. Pat. No. 7,962,495 (the '495 patent), issued Jun. 14, 2011, the entire contents of which are expressly incorporated herein by reference for all purposes. Among other things, the '495 patent describes embodiments that define a dynamic ontology for use in creating data in a database. For creating a database ontology, one or more object types are created where each object type can include one or more properties. The attributes of object types or property types of the ontology can be edited or modified at any time.

In some embodiments, each property type is declared to be representative of one or more object types. A property type is representative of an object type when the property type is intuitively associated with the object type. For example, a property type of "profession" can be representative of an object type "human" but not representative of an object type "locale." Each object can be identified with an identifier, and each property type can be associated with a property value.

Schema map 240 can define how various elements of schemas 235 for data sources 230 map to various elements of ontology 250. Definition component 210 receives, calculates, extracts, or otherwise identifies schemas 235 for data sources 230. Schemas 235 define the structure of data sources 230—for example, the names and other characteristics of tables, files, columns, fields, properties, and so forth. Definition component 210 furthermore optionally identifies sample data 236 from data sources 230. Definition component 210 can further identify object type, relationship, and property definitions from ontology 250, if any already exist. Definition component 210 can further identify pre-existing mappings from schema map 240, if such mappings exist.

Transformation component 220 can be invoked after schema map 140 and ontology 250 have been defined or redefined. Transformation component 220 identifies schema map 240 and ontology 250. Transformation component 120 further reads data sources 230 and identifies schemas 235 for data sources 230. For each element of ontology 250 described in schema map 240, transformation component 220 iterates through some or all of the data items of data sources 230, generating elements of object model 260 in the manner specified by schema map 240. In some embodiments, transformation component 220 can store a representation of each generated element of object model 260 in a database 270. In some embodiments, transformation component 220 is further configured to synchronize changes in object model 160 back to data sources 230.

Data sources 230 can be one or more sources of data, including, without limitation, spreadsheet files, databases, email folders, document collections, media collections, contact directories, and so forth. Data sources 230 can include structured data (e.g., a database, a .csv file, or any tab delimited or fixed-width file), semi-structured data (e.g., an email, an email server, or forms such as a suspicious activity report or currency transaction report), or unstructured data (e.g., encoded files such as PDF, sound, and image files). Data sources 230 can include data structures stored persistently in non-volatile memory. Data sources 230 can also or instead include temporary data structures generated from underlying data sources via data extraction components, such as a result set returned from a database server executing an database query.

Schema map 240, ontology 250, and schemas 235 can be stored in any suitable data structures, such as XML files, database tables, and so forth. In some embodiments, ontology 250 is maintained persistently. Schema map 240 can or cannot be maintained persistently, depending on whether the transformation process is perpetual or a one-time event. Schemas 235 need not be maintained in persistent memory, but can be cached for optimization.

Object model 260 comprises collections of elements such as typed objects, properties, and relationships. The collections can be structured in any suitable manner. In some embodiments, a database 270 stores the elements of object model 260, or representations thereof. In some embodiments, the elements of object model 260 are stored within database 270 in a different underlying format, such as in a series of object, property, and relationship tables in a relational database Based on the identified information, definition component 210 can generate a graphical interface 215. Graphical interface 215 can be presented to users of a computing device via any suitable output mechanism (e.g., a display screen, an image projection, etc.), and can further accept input from users of the computing device via any suitable input mechanism (e.g., a keyboard, a mouse, a touch screen interface). Graphical interface 215 can feature a visual workspace that visually depicts representations of the elements of ontology 250 for which mappings are defined in schema map 240. Graphical interface 215 can further utilize sample data 236 to provide the user with a preview of object model 260 as the user defines schema map 240. In response to the input via the various controls of graphical interface 215, definition component 210 can generate and/or modify ontology 250 and schema map 240, and/or identify object models and sample data schemas 235 and data sources 230. In some embodiments, one or more states of representation of the elements of ontology 250 can be stored separately from data schemes 235 and data sources 230, and graphical interface 215 can represent graphically, for example, sample data 236 according to the one or more states of representation.

Figure 3A:
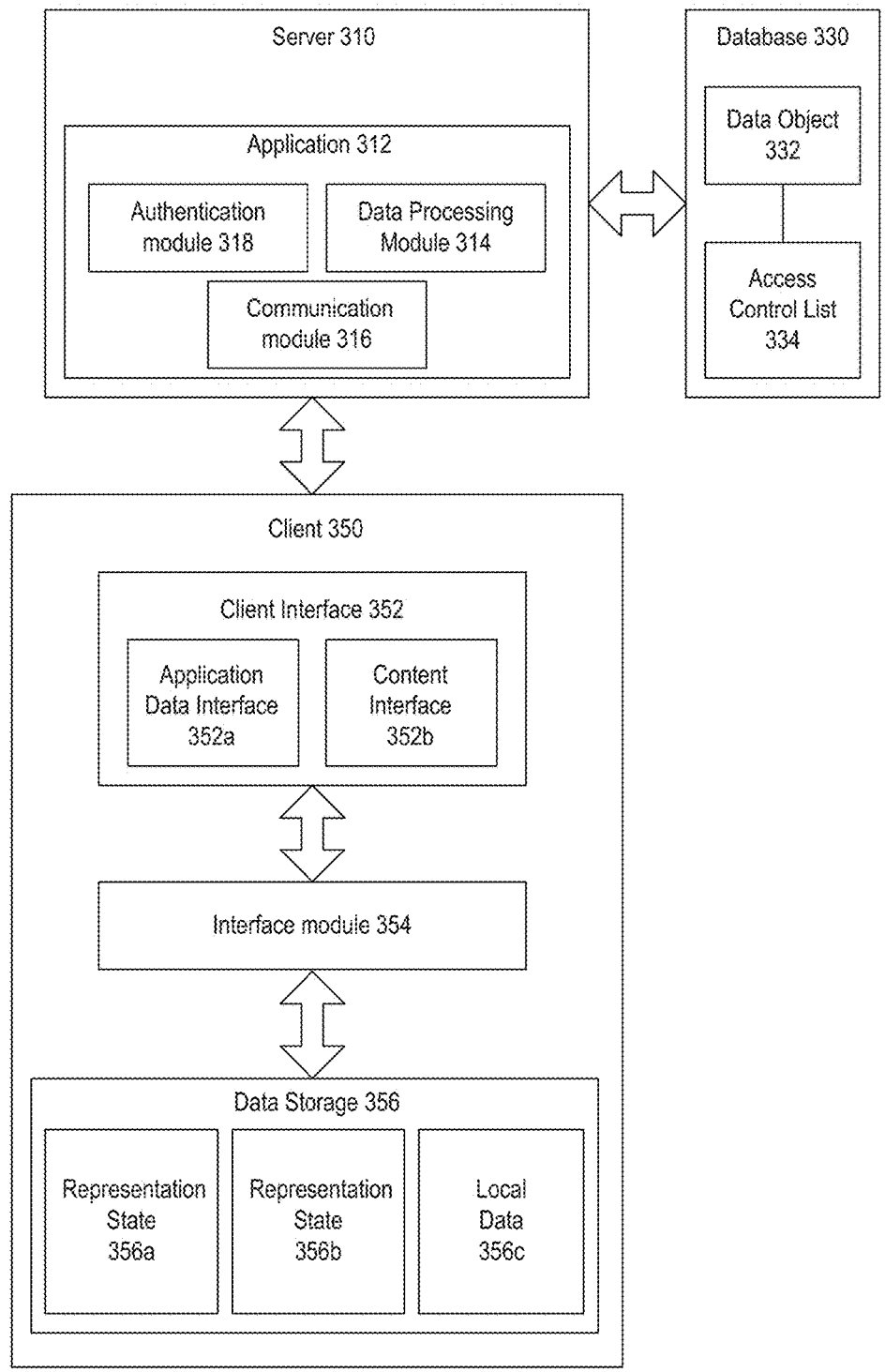
FIG. 3A is a block diagram illustrating an exemplary system providing an interface to access and represent data objects based on a stored state of representation, consistent with embodiments of the present disclosure.

FIG. 3A is a block diagram illustrating an exemplary system 300 providing an interface to access and represent data objects based on a stored state of representation, consistent with embodiments of the present disclosure. In some embodiments, system 300 provides a server 310 coupled with a database 330. Database 330 can include similar features as database 270 as shown in FIG. 2. While FIG. 3A shows server 310 and database 330 being separate components, it is appreciated that server 310 and database 330 can be part of the same component. Server 310 can communicate with client device 350 and can allow client device 350 to access database 330.

As shown in FIG. 3A, server 310 can host an application 312, which can include modules to provide data (e.g., sample data 236 or data of database 270) to be represented. Application 312 can include a data processing module 314, which processes a request from client device 350 to access appropriate data. Based on this request, data processing module 314 can then acquire the requested data from database 330, and transmit at least part of the acquired data to the client. Application 312 can also include a communication module 316, which can interact with communication interface 118 as shown in FIG. 1 to, for example, facilitate the acquisition of data from server 310 and the transmission of the acquired data to client device 350.

In some embodiments, the requested sample data 236 can include the data represented by one or more data objects 332 defined according to object model 260 as shown in FIG. 2 and stored in database 330. Data object 332 can also be associated with an access control list 334. Exemplary embodiments for access control list 334 are described in U.S. patent application Ser. No. 13/956,326, entitled "Techniques for Replicating Changes to Access Control Lists on Investigative Analysis Data," filed Jul. 31, 2013 (now U.S. Pat. No. 8,838,538), and in U.S. patent application Ser. No. 14/286,485, entitled "Cross-ACL Multi-Master Replication," filed May 23, 2014, the entire contents of which are expressly incorporated herein by reference for all purposes. Access control list 334 can include information governing an access to data object 332. For example, access control list 334 can include a list of users who can access data object 332, and how they can access the object. As an example, the access control list can define whether a particular user can read or write to the object, and to which particular attribute(s) or property(s) of the object.

In some embodiments, application 312 can also include an authentication module 318. Authentication module 318 can receive identification information from client device 350 to identify a particular user using the client device to request for data object 332. Authentication module 318 can then provide the identification information to data processing module 314. Data processing module 314 can then determine, based on the identification information and access control list 334 information associated with data object 332, which part of data object 332 is to be sent to client device 350. In some embodiments, authentication module 318 can acquire one or more credentials, such as a user login name and a password, from the client device, and then match that information against a user database (not shown in FIG. 3A), to verify the authenticity of the user and to establish the user's identity. In some embodiments, server 310 can receive credential information for a group of participants.

In some embodiments, client device 350 can include a display device (not shown in FIG. 3A) to provide a client interface 352. Client interface 352 can include one or more application data interfaces 352a to access data object 332 provided by application 312. In some embodiments, client interface 352 can display a page of a document or a presentation slide and provide a representation of data object 332 via application data interface 352a concurrently. Client interface 352 can also include one or more content interfaces 352b to access other data of the document or the presentation slide acquired separately from data object 332. The content data can be, for example, text data, graphics or video data, audio data, or any other embedded data object. In some embodiments, client interface 352 can provide either interface 352a or interface 352b at a time, and allow switching between the two interfaces. In some embodiments, both interface 352a and 352b are provided concurrently.

Client device 350 can also include an interface module 354. Interface module 354 can provide the data to be rendered in client interface 352. In some embodiments, interface module 354 can receive one or more data objects 332 from application 312 and, based on a state of representation of the data objects, provide data for rendering the data objects via application data interface 352a in the display device. A state of representation can be included as part of an artifact. An artifact can include a collection of data used to facilitate a displaying of data objects 332 via application data interface 352a. The representation can be graphical and/or textual visual depiction. In some embodiments, the artifact can include, for example, an identifier for the application 312 that provides the data objects 332, a list of data objects 332 to be represented, and any other information pertinent to the graphical rendering of the data objects, such as shape and color of the graphical elements that represent the data objects, the co-ordinates of the graphical elements, the format of the graphical representation (e.g., depending on whether the map or the graph application is providing the data objects), the background, associated texts, etc., while a state of representation can be associated with a state of these information. The attributes of the graphical element (e.g., shape, color, etc.) of the data object can also be related to the data represented by the data object. Interface module 354 can generate the state of representation of the data objects, or acquire the state from other sources including, for example, application 312, or from other storage sources as discussed below.

Client interface module 354 can also acquire a manipulation of the representation of the data objects via application data interface 352a, and update the rendering in real-time. For example, interface module 354 can acquire a user's action within interface 352a. Such action can include but is not limited to an activation of a data object (e.g., a selection), an action to move a graphical element representing the data object to a different location, an action to navigate and zoom into another portion of the graphical representation, an action to invoke another application, and/or an action to open another interface separate from the first interface for a separate graphical representation of the same or other data objects, etc. Based on the acquired action, interface module 354 can update the data for rendering the data objects and provide the data to interface 352a. Also, if, as a result of the manipulation, more data objects are to be displayed via interface 352a, interface module 354 can also provide a request for the additional data objects to application 312. Interface module 354 can also acquire an editing of the data objects (e.g., editing of the attribute(s) and/or propertie(s) of the data objects) via application data interface 352a, and synchronize the editing with server 310. Exemplary systems and methods for synchronizing changes to the data objects are described in U.S. patent application Ser. No. 13/922,437, entitled "System and Method for Incrementally Replicating Investigative Analysis Data," filed Jun. 20, 2013; U.S. patent application Ser. No. 14/076,385, entitled "Assisting in Deconflicting Concurrent Conflicts," filed Nov. 11, 2013; and U.S. patent application Ser. No. 14/156, 208, entitled "Cross-Ontology Multi-Master Replication," filed Jan. 15, 2014, the entire contents of which are expressly incorporated herein by reference for all purposes. In some embodiments, interface module 354 can also provide content data of the document or presentation to be rendered in content interface 352b, and update the content data (and/or the representation of it) after acquiring a manipulation of the data via content interface 352b.

Client device 350 can also include data storage unit 356. Data storage unit 356 can be any non-volatile storage device, such as hard drive, flash memory, etc. In some embodiments, storage unit 356 can be used to store information about a first representation state 356a, which can then be provided to interface module 354 to generate the data for rendering a graphical representation of data objects 332 via application data interface 352a. In some embodiments, state 356a can be associated with a first timestamp. The first timestamp can represent, for example, the time at which a user last requested to store the representation of data objects 332. Storage unit 356 can also store information about a second representation state 356b, which can also be provided to interface module 354 to generate the data for rendering data objects 332 via application data interface 352a. In some embodiments, state 356b can be associated with a second timestamp. The second timestamp can represent, for example, the time at which the user last manipulated (without requesting to store) the representation of data objects 332. Therefore, state 356b can be used to store and to track the most up-to-date representation state of the data objects, allowing application data interface 352a to interactively render the data objects in response to user's manipulation in real-time. In some embodiments, data storage unit 356 can be used to store states associated with other timestamps (not shown in FIG. 3A), which can allow the user to track the changes to the representation state of the data objects.

As shown in FIG. 3A, data storage unit 356 can also be used to store local data 356c, which can include, but is not limited to, the content data to be rendered via content interface 352b, local copy of edited data object 332 for later synchronization, etc. In some embodiments, local data 356c and at least one of states 356a and 356b can be stored as part of a data file associated with the document or the presentation slides, and the data file can be shared by, for example, emailing as an attachment, or stored in a depository where other users can access.

FIG. 3B is a chart illustrating an exemplary application data object 363, consistent with embodiments of the present disclosure. Data object 363 can have similar features as data object 323 as shown in FIG. 3A. Data object 363 can include an object ID field 363a that is associated with a value, for example 123456, and an object type field 363b that is associated with a text string, for example "human." Object ID can be used to identify the data object and can be used to refer to the data object by, for example, a state of representation as discussed before. Object 363 can also include a property type field 363c, a property value field 363d, and an access control field 363e. As shown in FIG. 3B, data object 363 can be associated with a plurality of property types, each property type being associated with a value and an access control policy. For example, data object 363 as shown in FIG. 3B can be associated with a human being whose name, as indicated by the value associated with the name property type, is John. The name property type is also associated with a display-only access control policy, meaning that a user who accesses data object ID 123456 can only view the name property type of the data object. Other property types of data object ID 123456 can be associated with different values and different access control policy. For example, the profession property type of data object ID 123456, as shown in FIG. 3B, is inaccessible, meaning that the value associated with this particular property type will not be available for displaying and/or editing, whereas the language property type of the same data object is available for both displaying and editing.

In some embodiments, the access control policy for each property type of the data object can be determined by the access control list (e.g., access control list 334 of FIG. 3A) associated with the data object. For example, the access control list can include a list of users, and indicate the access rights with respect to each property type for each user. After verifying the identity of the user who is accessing the data object (via, for example, authentication module 318), the user's access rights information associated with the data object can be retrieved and provided, together with the data object, to interface module 354 of the client device. Interface module 354 can then control the user's access to the data object, via client interface 352, according to the access right information.

Figure 4A:
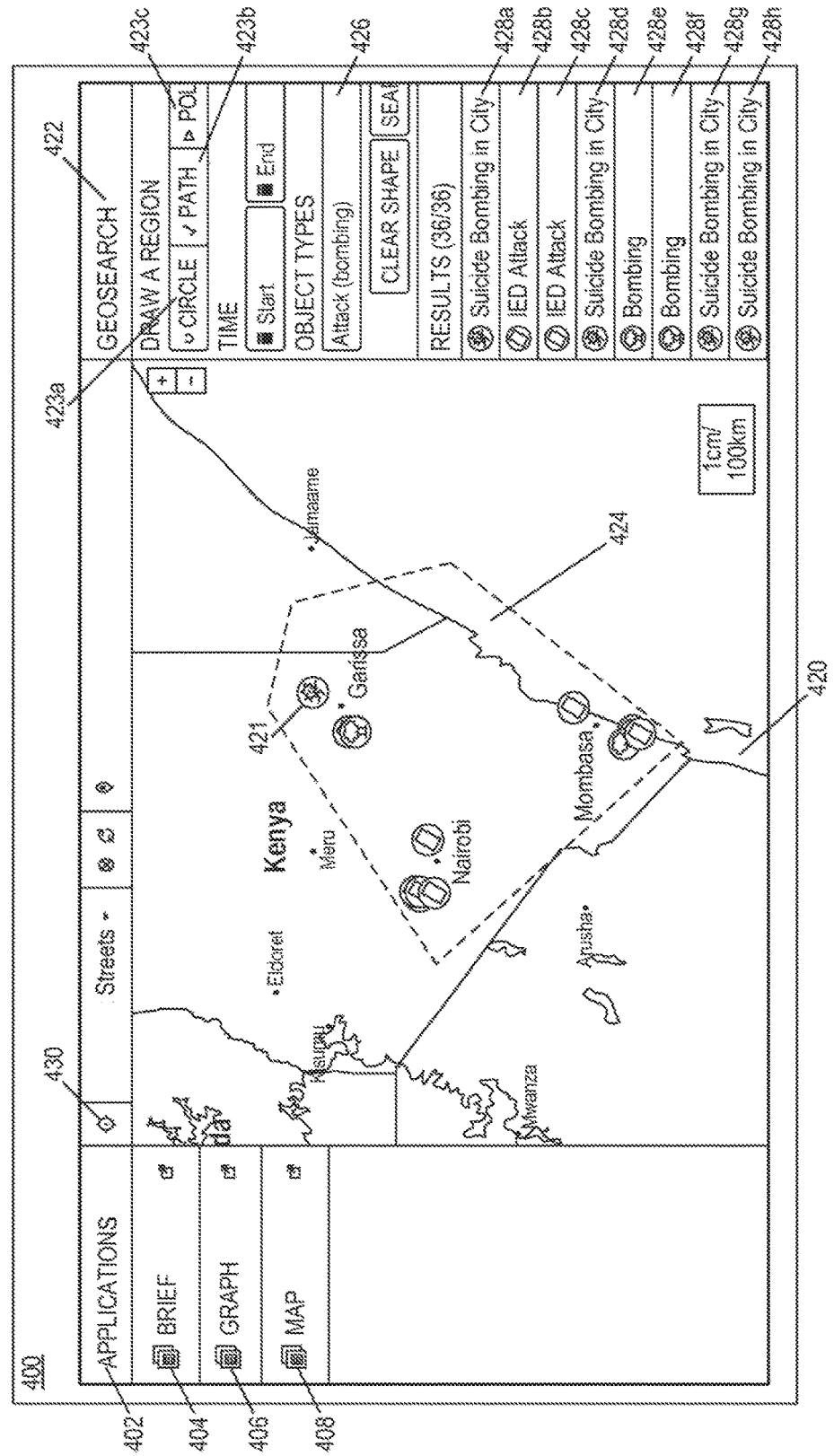
FIGS. 4A-4G represent exemplary interfaces for accessing and representing application data objects, consistent with embodiments of the present disclosure.

FIGS. 4A-4G represent exemplary interfaces 400 for accessing and representing application data objects, consistent with embodiments of the present disclosure. Interface 400 can include similar features as client interface 352 of FIG. 3A, and can be supported by interface module 354 of FIG. 3A. Interface 400 can include an applications menu 402, which provides options 404, 406, and 408. A user can activate option 404 to invoke a brief application, option 406 to invoke a graph application, and option 408 to invoke a map application. In some embodiments, the graph application and the map application can provide data to facilitate graphical representations, in a graph format and a map format respectively, of one or more data objects. Although FIG. 4A shows that a graph application and a map application are accessible via applications menu 402, it is appreciated that other applications providing visual representation of information can be accessed via exemplary interface 400, such as a web browser, a document viewer, etc. As discussed later, the brief application can provide access to a document (e.g., a presentation slide), as well as access to a representation of the data objects either facilitated by the graph application or by the map application. In some embodiments, at least one of these applications are hosted remotely, similar to application 312 being hosted on server 310 of FIG. 3A.

As shown in FIG. 4A, the map application can be invoked in interface 400, after the brief application is invoked. In this exemplary illustration, the map application can display, via interface 400, a map 420 to represent a distribution of one or more data objects, including data object 421, within a specific geographical region, in this case part of Eastern Africa with Kenya in the middle. In this particular example, the data objects can be related to information about terroristic activities associated with a particular location as indicated in map 420. Map 420 can also indicate, via box 443, that the map is rendered with a scale of 1 cm/100 km. The representation of the distribution can be generated via a geosearch menu 422. Geosearch menu 422 can include a circle option 423a, a path option 423b, and a polygon option 423c, with each option indicating a mode of selecting a region displayed in the map. In some embodiments, as shown in FIG. 4A, after the polygon option is selected, the application allows the user to draw a polygon 424 on the map, the boundary of the polygon defining the region being selected. The application then allows the user to search for one or more data objects associated with the selected region, based on specific search criteria. For example, a user can select, in field 426, an object type associated with "attack (bombing)." Based on this search criterion, a list of object types 428a-428h, each with properties related to the object type "attack (bombing)," can be displayed. Data objects with the listed object types, including data object 421, can be shown as highlighted spots in map 420.

Interface 400 also provides an add button 430. Activating add button 430 can create an artifact, which captures a state of the representation of the data objects in map 420, which can include information such as an indicator associated with the map application, the geographical location of map being displayed (e.g., Eastern Africa, with Kenya in the middle), the representation scale of the map (1 cm/100 km), and the list of data objects selected for displaying, at the time when add button 430 is activated. Activating add button 430 can also allow the user to switch back to the brief application.

Figure 4B:
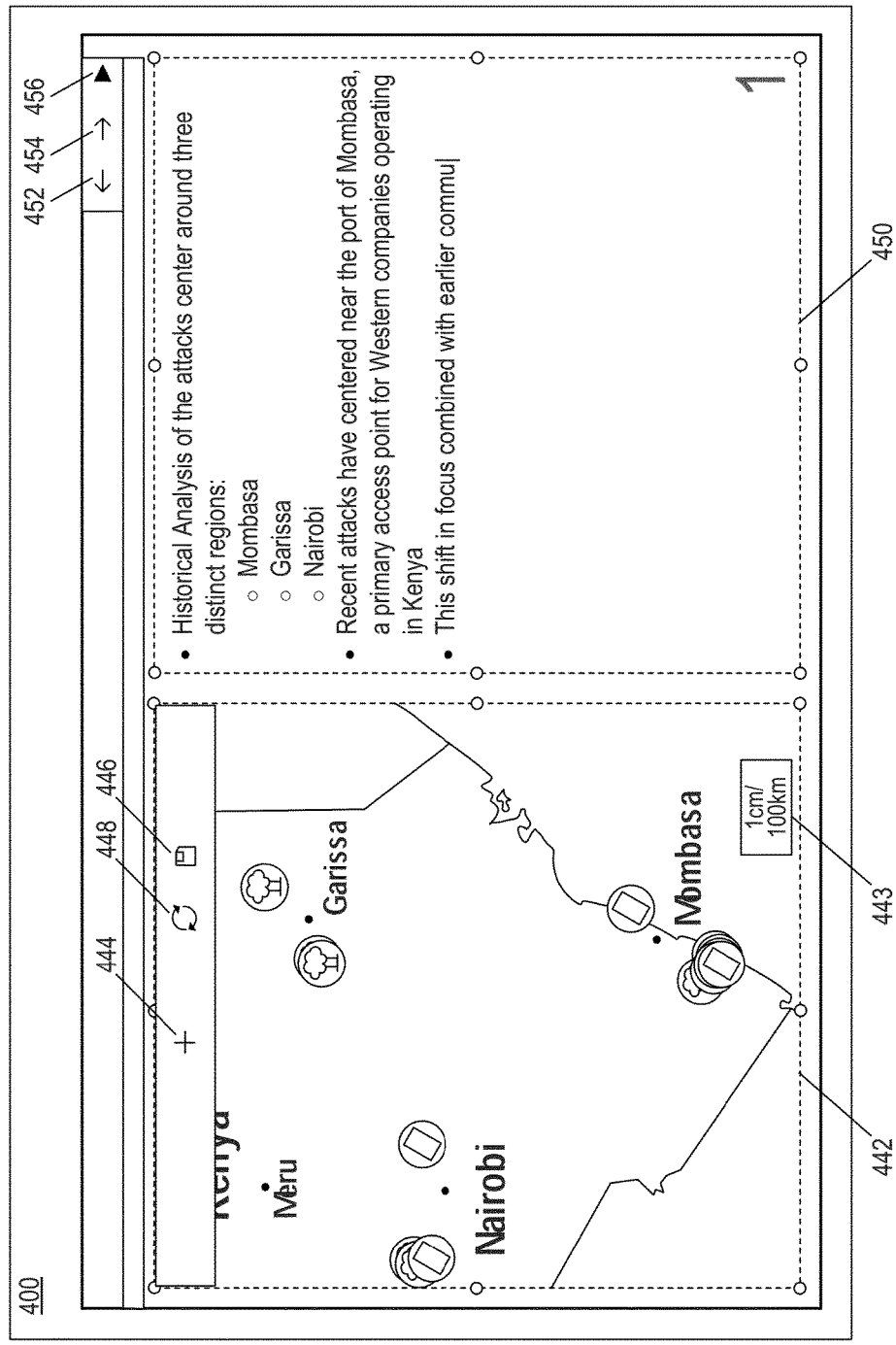

After selecting add button 430, the user can "drop" the artifact into a visual representation of one or more contents of a document file, where the representation is provided by the brief application via interface 400. Such a document file can be a Microsoft Word™ document, a Microsoft Power-Point™ presentation slide, or of any other format including content that can be visually represented. Throughout this disclosure, a presentation file, which includes data for one or more presentation slides, is used as an illustrative example. As shown in FIG. 4B, interface 400 provides, as part of a representation of a presentation slide, an interface 442 and an interface 450. The artifact associated with the map application can be displayed via an interface 442, and the state of representation can cause the display to focus on the same geographical region, with the same scale (indicated via box 443), and the same selected data objects being displayed as in FIG. 4A, according to the state of the representation created following the activation of add button 430 in FIG. 4A. Interface 442 can be implemented as application data interface 352a of FIG. 3A. Interface 442 can allow a user to manipulate the representation of the data objects by, for example, dragging the displayed map to shift to a different geographical location, zooming into or out of a particular area, etc., thereby changing the scale of representation and the list of data objects displayed, etc.

Interface 442 also provides a maximize button 444, a save button 446, and a restore button 448. After activation of maximize button 444, interface 442 can expand within interface 400, as shown in FIG. 4D. In some embodiments, interface 442 allows a user to alter the information displayed, for example, by receiving input that shifts the displayed map to a different geographical location, thereby altering the representation state of the one or more data objects. The ability to dynamically manipulate the representation of data objects shown in interface 442 can be useful for a user when presenting information to an audience having questions that may be unpredictable. For example, by having the ability to expand interface 442, the presenter can access additional features of the application or display additional data objects to manipulate the representation of the data objects, and can easily switch back to the presentation mode when the manipulation is finished, so that the manipulated data objects can be represented as part of the representation of the presentation slide. Besides, after activation of save button 446, the manipulated state of representation can be stored and can overwrite the state of representation at the time add button 430 of FIG. 4A is activated. On the other hand, activation of restore button 448 can lead to restoring of the state of the representation back to the time when add button 430 of FIG. 4A is activated.

Referring back to FIG. 4B, Interface 450 allows the user to put in other content of the presentation slide, including text, graphics, or any other data objects. In some embodiments, interface 450 allows a user to perform Rich Text Format editing. As shown in FIG. 4B, the boundary of the interfaces 450 and 442 can be delineated via dotted lines. Interface 400 also provides forward button 452 and backward button 454, both of which can allow a user to navigate between the presentation slides. Interface 400 further provides a slide-show button 456, which can allow a user to enter the aforementioned presentation mode with interface 400.

Figure 4C:
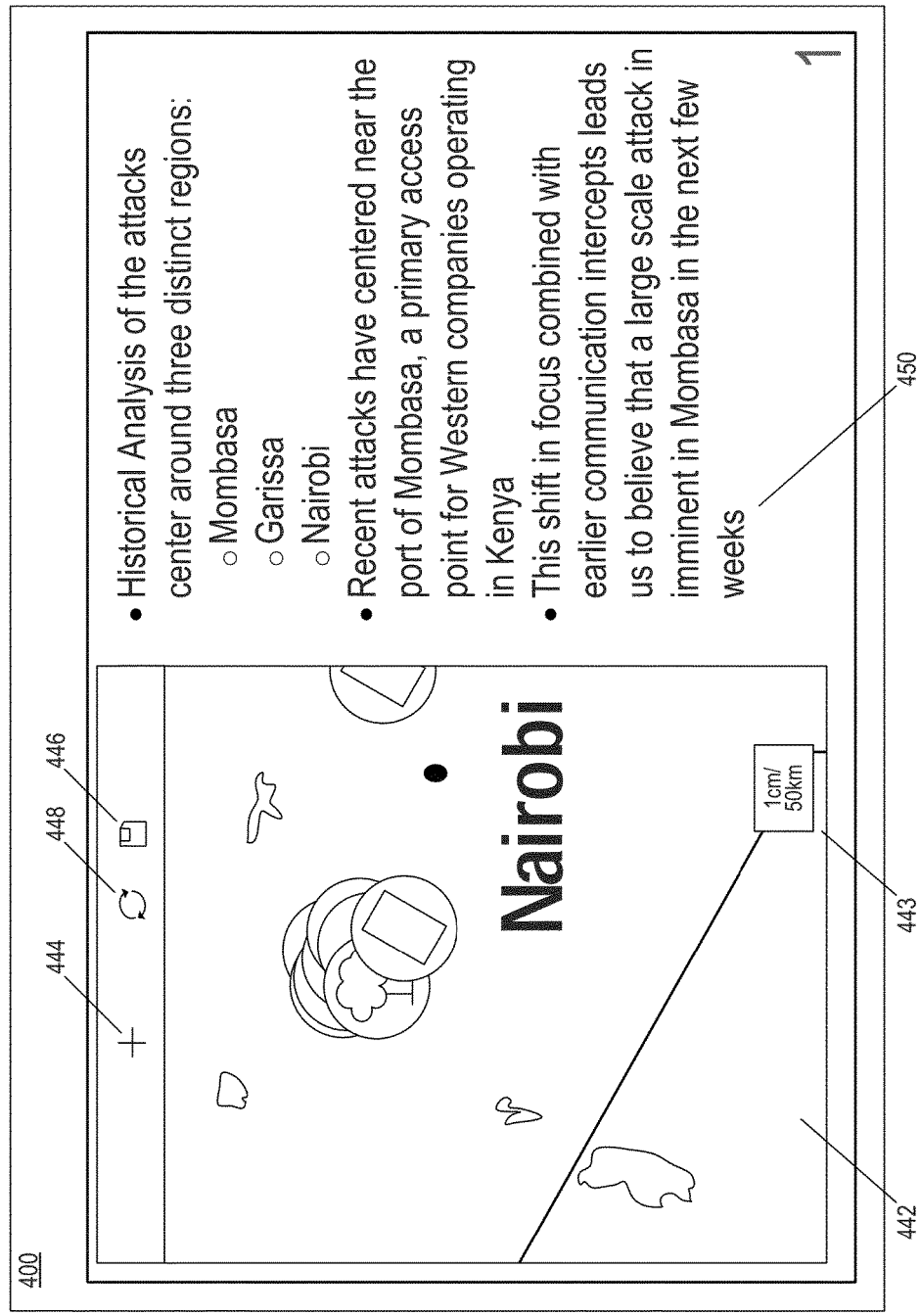
Figure 4D:
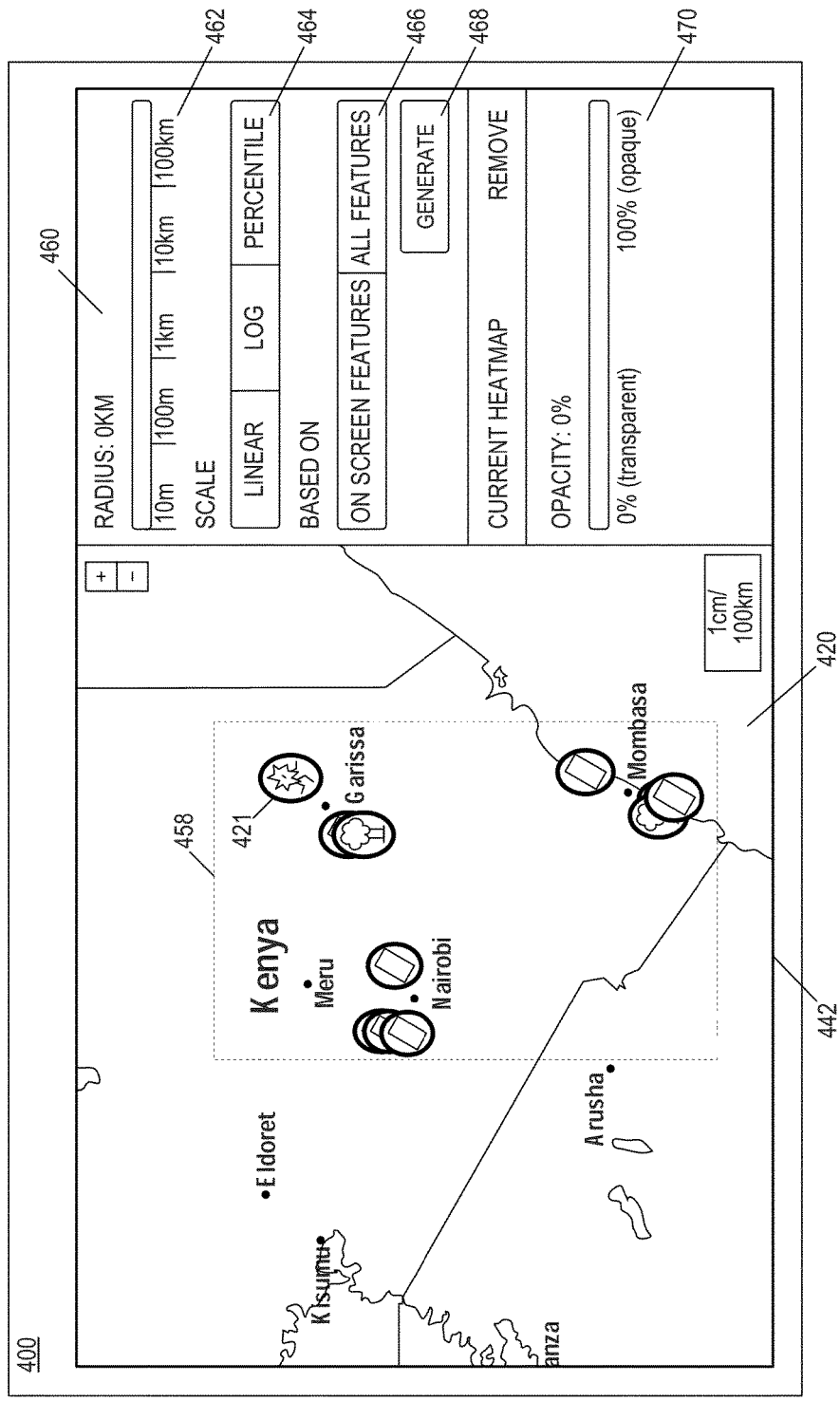

FIG. 4C depicts an exemplary presentation mode with interface 400 consistent with embodiments of the present disclosure, after the user activates slide-show button 456 as shown in FIG. 4B. In some embodiments, the presentation mode provides a representation of the presentation slides in a slide show manner. During the presentation mode, both interfaces 442 and 450 can be provided, but with the dotted-line boundaries removed from displaying. During the presentation mode, interface 450 can display a state of the content (e.g., text, graphics, etc.) of a presentation slide based on user's activation of slide-show button 456 to activate the presentation mode. Interface 442, on the other hand, remains capable of allowing the user to manipulate the representation of the data objects during the presentation mode. For example, as shown in FIG. 4C, interface 442 allows the user to shift the displayed map, to zoom in to or out of a specific area within the map (e.g., changing the scale from 1 cm/100 km to 1 cm/50 km as shown in box 443), and to select one or more data objects, during the presentation mode.

Figure 4E:
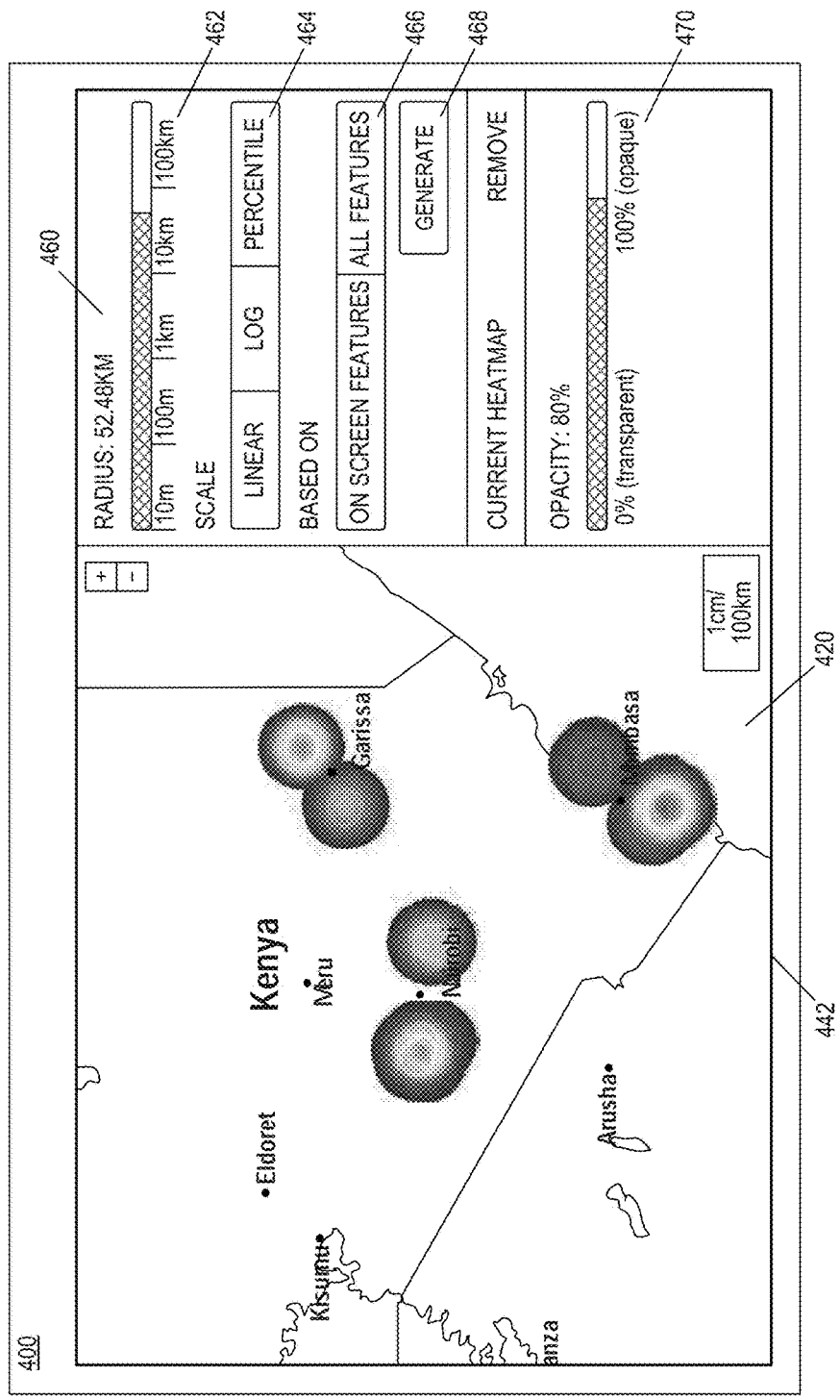

FIGS. 4D-4E depict an exemplary expansion of interface 442 after maximize button 444 is activated, consistent with embodiments of the present disclosure. Maximize button 444 can be activated during the presentation mode, or in other time when the slide is being created or edited. The expanded interface 442 can allow the user to access other features of the application (e.g., starting a new analysis to acquire a different set of data and/or a different representation of data), which may not otherwise be accessible before the interface expands. In this exemplary illustration, as shown in FIG. 4D, the expanded interface 442 displays map 420, which depicts a similar part of Eastern Africa as in FIG. 4A. The expanded interface 442 allows a user to select one or more data objects, including data object 421, to start a new analysis based on the selected data objects, by drawing a line 458 around the data objects. Line 458 can form a rectangle, as shown in FIG. 4D, or any shape. The selected data objects can become highlighted at the boundary to indicate the selected portion. In the illustrative example as shown in FIG. 4D, a distribution of a pre-defined activity (e.g., "attack (bombing)") chosen in interface 400 as shown in FIG. 4A), within a pre-defined radius, can be generated around the locations associated with the selected data objects. The distribution can be represented as a circular heatmap centered around each location, with different colors representing, for example, a density of the distribution. The density of the distribution can be part of the data represented by the data objects, which can then be used to change the attributes (e.g., color) of the graphical elements representing the data objects, as discussed before.

Interface 442 can also provide a menu 460. Menu 460 can include a slider 462 to define the radius for which the distribution is selected for representation, options 464 to define a scale based on which the distribution is represented, options 466 to choose a feature whose distribution is to be represented (e.g., to represent the distribution of "attack (bombing)" as chosen in FIG. 4A, or to represent the distribution of other activities), and a generate button 468, which is activatable to generate the heatmap based on the aforementioned settings. Menu 460 can further include a slider 470, which can allow the user to define the opacity of the circular heatmap as to be displayed in map 420. FIG. 4E depicts a generation of the circular heatmaps after the user selects a radius of 52.48 km using slider 462 and opacity of 80% using slider 470. In some embodiments, the generation of the circular heatmaps in FIG. 4E can be part of the launching of a new investigation based on map 420.

As the user manipulates the representation of the data by, for example, zooming into a specific map area (as shown in FIG. 4C), expanding the displayed map area and the associated data objects (as shown in FIG. 4D), or requesting for another representation of the data objects (also as shown in FIG. 4D), a change in state of representation can be detected and tracked. For example, interface module 354 of FIG. 3A can track the changes, and send a request to server 310 to receive data to affect the change in the representation. In some embodiments, after detecting that the interface 442 is expanded, and that more data objects are represented, interface module 354 can send a request to server 310 for more data (e.g. an enlarged size of sample data 236) to support the representation of the additional data objects. In some embodiments, the user can also modify the data represented by, for example, adding or removing data objects, adding in other additional data components associated with the data objects, etc., via the expanded interface 442, and the state of representation can capture all these changes. The user can then click on save button 446 to store the state of the representation in the presentation file. As a result, the representation of the data objects (or any changes thereof) can be moved or copied from one file to another, and the data objects can become accessible via different document files, as long as each file stores a state of representation of the data objects.

Figure 4F:
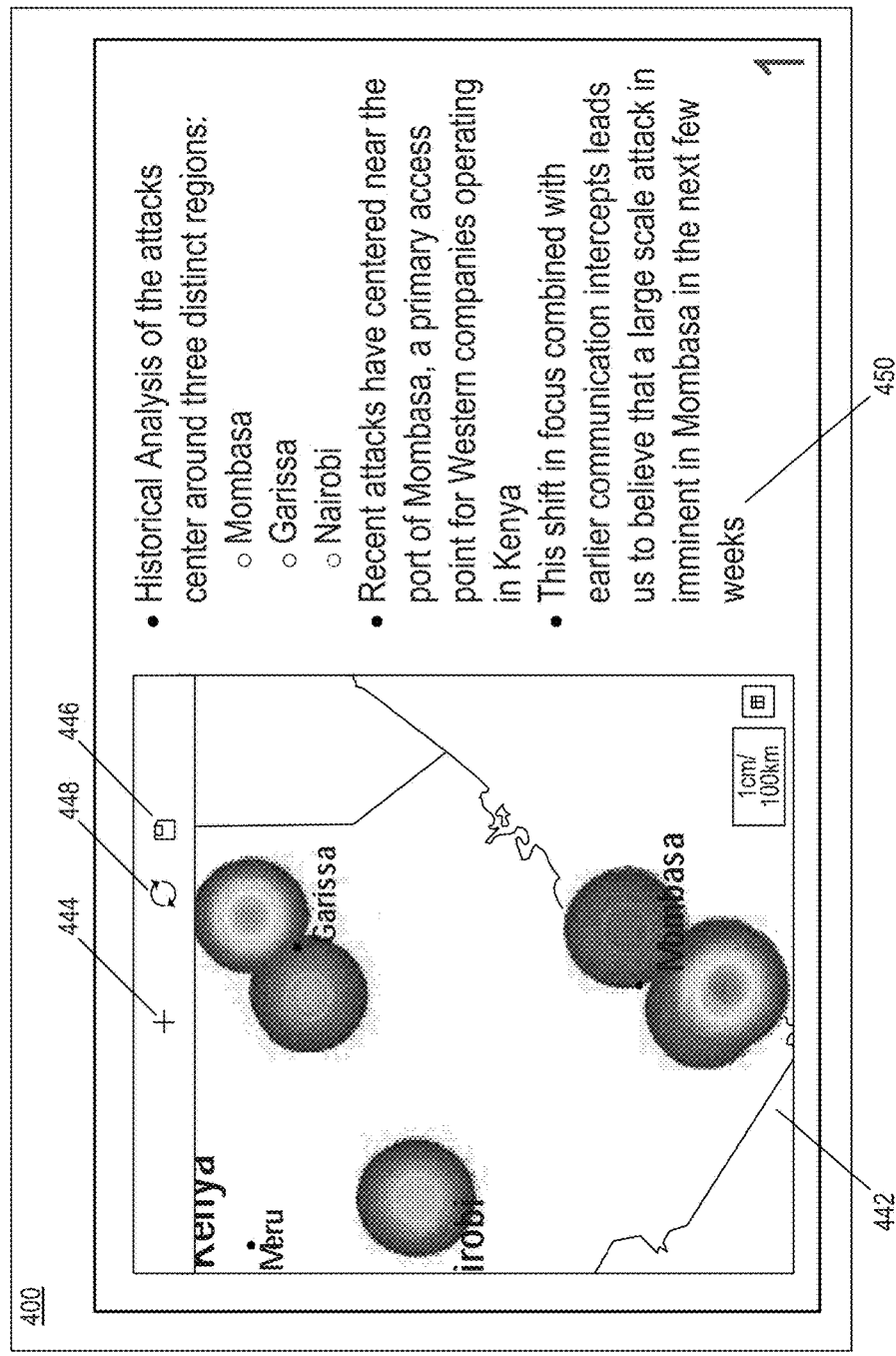
Figure 4G:
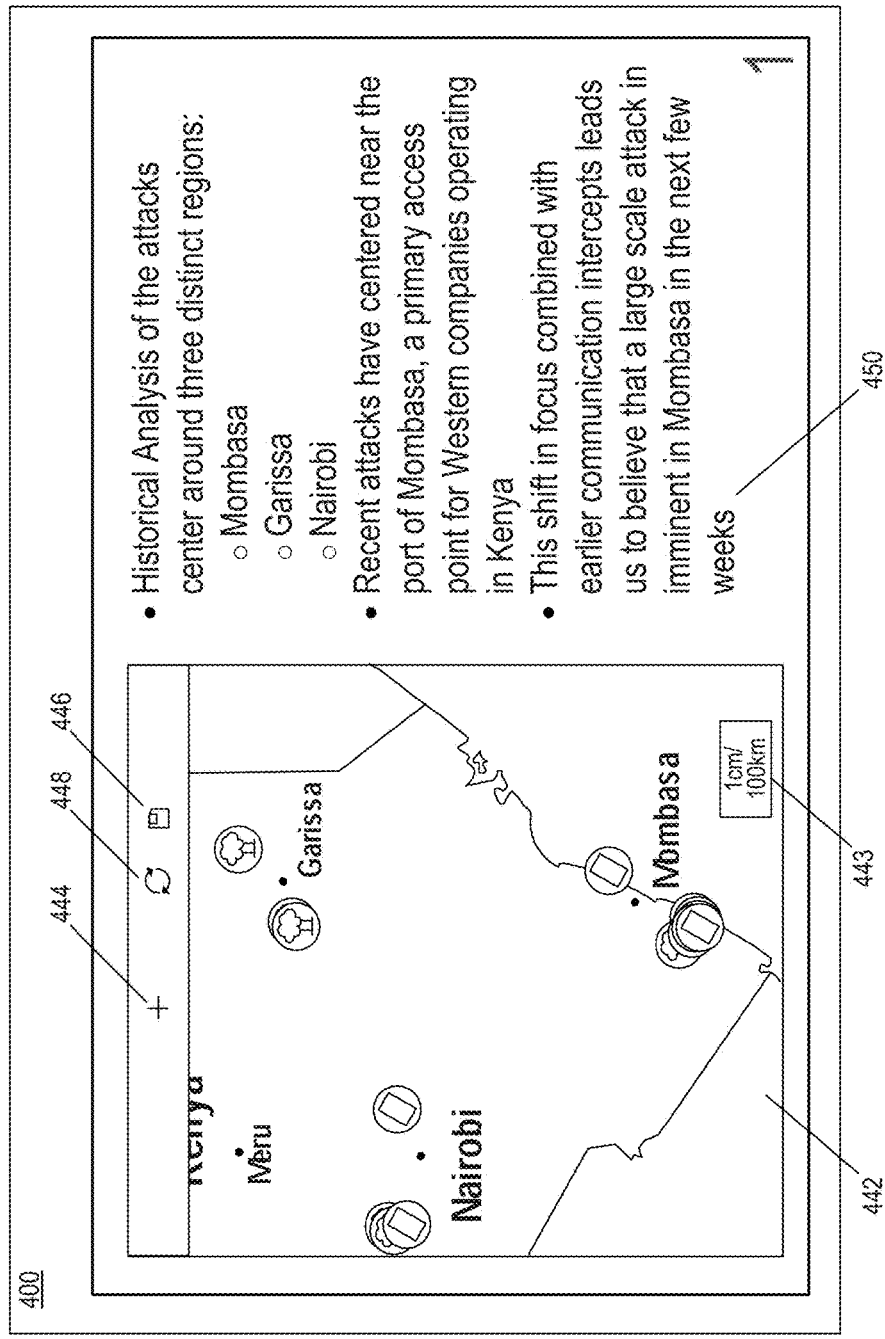

FIG. 4F depicts an exemplary presentation mode with interface 400 consistent with embodiments of the present disclosure, after interface 442 has been restored from its expanded form in FIG. 4E. As shown in FIG. 4F, interface 442 maintains a state of the representation of the data objects (e.g., distribution of events in the form of heatmaps, zoomed-in geographical location, etc.) right before the expanded interface 442, as shown in FIG. 4E, is restored. This allows the presenter to use the new information obtained via the expanded interface 442 for the presentation. The presenter can also activate restore button 448 to switch back to an earlier representation of the data objects, as shown in FIG. 4G.

Figure 5A:
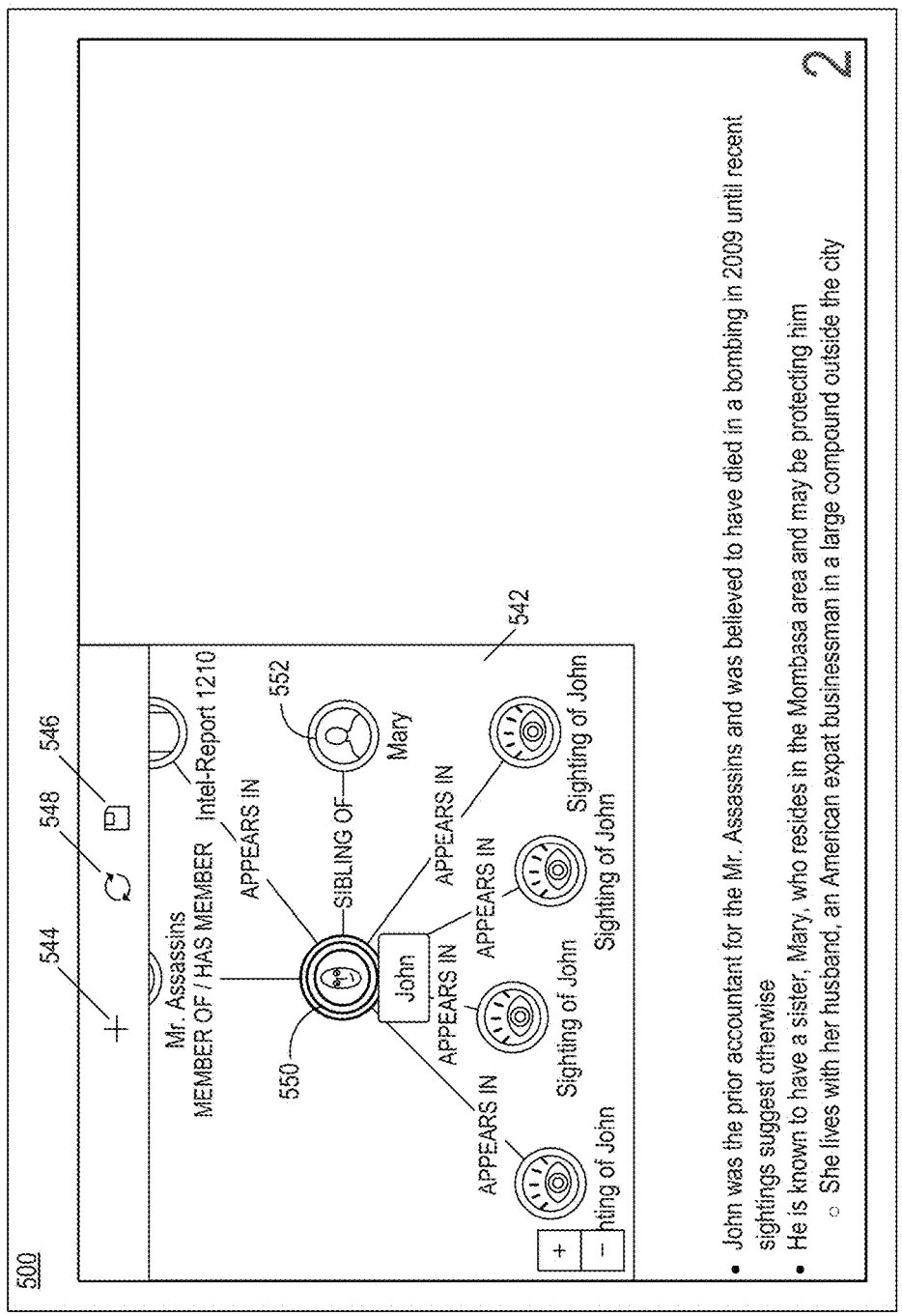
FIGS. 5A-5B represent exemplary interfaces for accessing and representing application data objects, consistent with embodiments of the present disclosure.
Figure 5B:
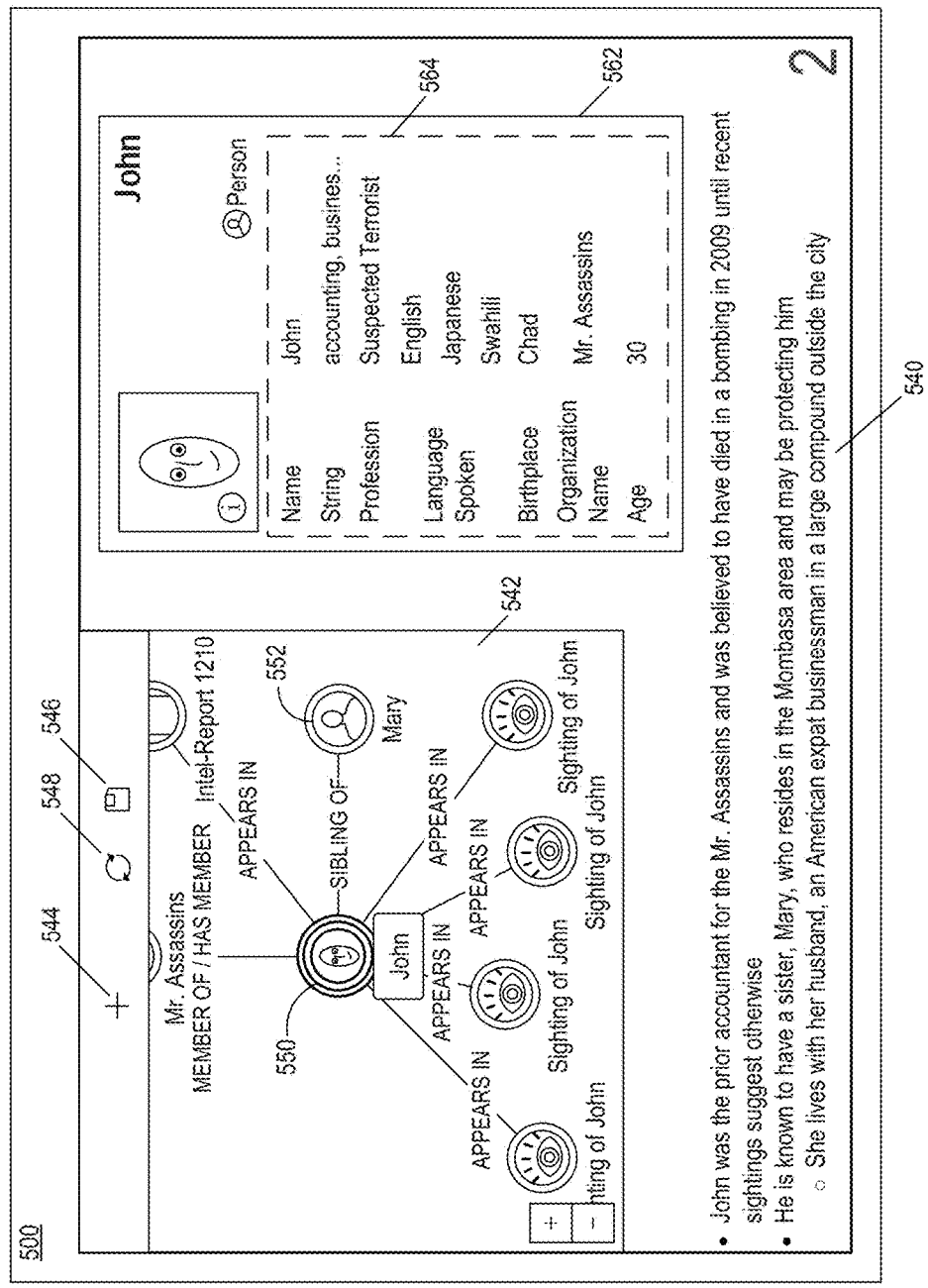

FIGS. 5A-5B represent an exemplary interface 500 for accessing and representing application data objects, consistent with embodiments of the present disclosure. Interface 500 can include similar features as interface 400 of FIGS. 4A-4F as well as client interface 352 of FIG. 3A, and can be supported by interface module 354 of FIG. 3A. As shown in FIG. 5, the brief application can be invoked in interface 500 to provide access to a presentation slide, and to represent the presentation slide in the presentation mode as discussed earlier. Interface 500 also includes an interface 542 through which the graph application can be accessed after, for example, option 406 of FIG. 4A is activated. Interface 542 can also provide maximize button 544, save button 546, and restore button 548, which can have similar functionalities as, respectively, maximize button 444, save button 446, and restore button 448 of interface 442. Facilitated by the graph application, interface 542 can provide a graph representation of one or more data objects, including data object 550 and data object 552 as shown in FIG. 5A. In this exemplary illustration, each data object is associated with a person, and the graph representation depicts a relationship between each data object. For example, data object 550 is associated with a person whose name is "John" and data object 552 is associated with a person whose name is "Mary," and the two data objects are related by virtue of, for example, the fact that John and Mary are siblings.

FIG. 5B illustrates an exemplary interface 562, which can be invoked, via interface 542, to display data associated with a data object shown in interface 542. As shown in FIG. 5B, interface 562 displays data 564 associated data object 550 shown in interface 542. In some embodiments, interface 562 can be provided by invoking another application separate from the graph and the map applications. In some embodiments, interface 562 can be provided after an embedded application associated with the data objects represented in interface 542, executes as a result of a user's activation of the data objects, or any other activatable features rendered in interface 542. For example, interface 562 can be provided by selecting object 550, or dragging the selected object 550 towards a location outside interface 542, to put interface 562 at that location or by selecting object 550. In some embodiments, upon detecting an activation of the data objects, interface module 354 can provide interface 562, and can send request to server 310 to receive data for representing the properties in interface 562.

In some embodiments, the data objects shown in interface 542 include similar features as the exemplary data object shown in FIG. 3A, and include one or more properties. The data 564 displayed in interface 562 can include a textual representation of one or more property types, and the corresponding property values. In some embodiments, the scope of property types (as well as the corresponding property values) displayed can be controlled by the access control policy associated with each property type of the data object. Depending on the identity of the presenter (or the user who is accessing the data object via interfaces 542 and 562), one or more property types can be made inaccessible by, for example, data processing module 314 after the user's identity is authenticated by authentication module 318 as shown in FIG. 3A, and the inaccessible property types are not shown in interface 562 accordingly.

Figure 6:
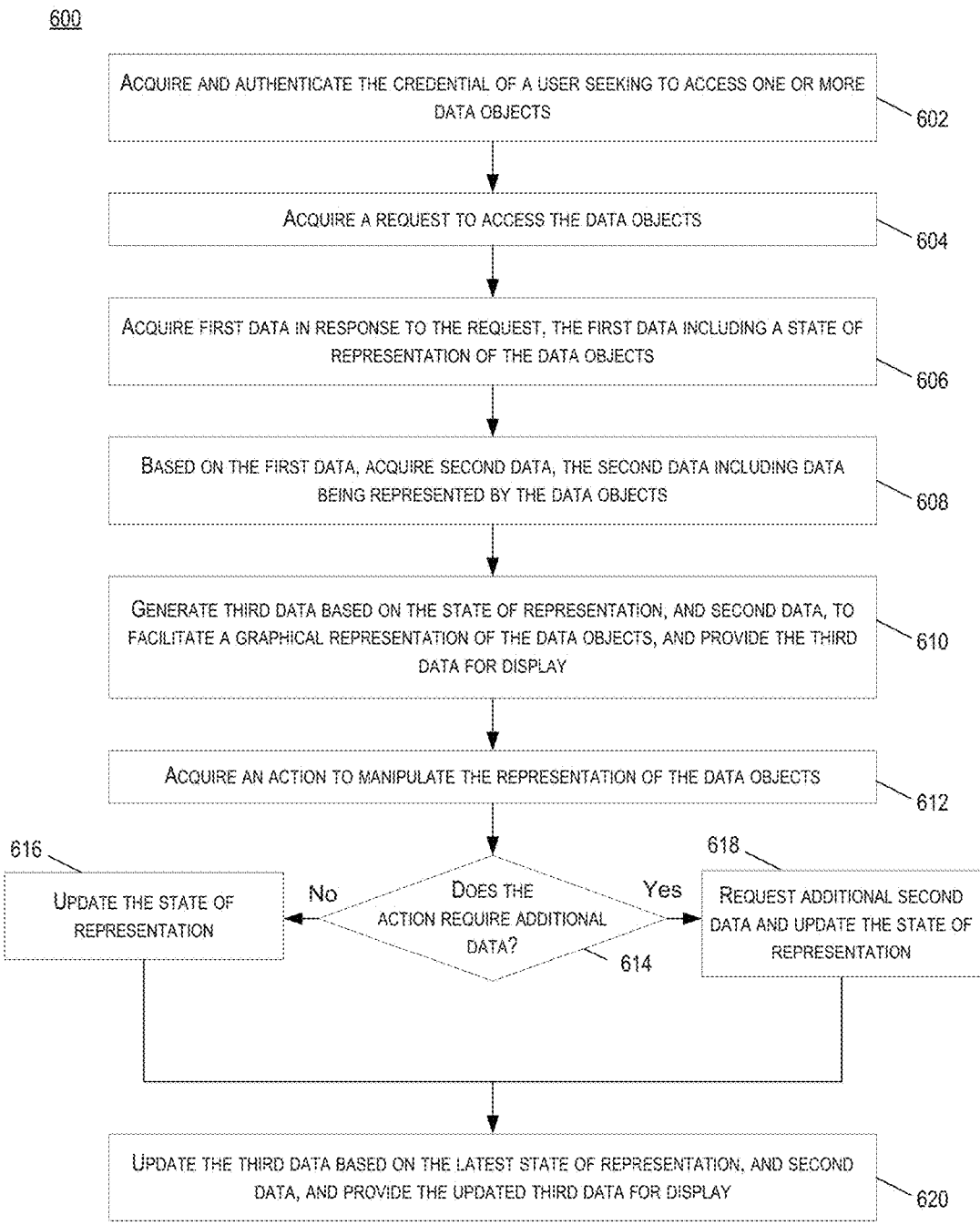
FIG. 6 is a flowchart representing an exemplary method performed by an electronic device for accessing and representing application data objects, consistent with embodiments of the present disclosure.

FIG. 6 is a flowchart representing an exemplary method 600 performed by an electronic device for accessing and representing application data objects, consistent with embodiments of the present disclosure.

In this exemplary illustration, the electronic device (e.g., client device 350 of FIG. 3A) can interact with one or more other devices and/or storage components (e.g., server 310 and database 330 of FIG. 3A) for assisting with the representation of one or more data objects (e.g. data object 332 of FIG. 3A). While the flowchart discloses the following steps in a particular order, it will be appreciated that at least some of the steps can be moved, modified, or deleted where appropriate, consistent with the teachings of the present disclosure. And while the following steps are indicated as being performed by an electronic device, it is appreciated that the steps can be performed by more than one electronic device.

In step 602, the electronic device acquires and authenticates the credential of a user who seeks to access one or more data objects, to establish an identity of the user. The data objects can be data object 332 provided by, for example, application 312 hosted on server 310 as shown in FIG. 3A. The authentication can occur when the user seeks to also access a document file via, for example, an interface (e.g., interface 400 of FIG. 4A and interface 500 of FIG. 5A). In some embodiments, the acquisition and authentication of the credential may not be required.

In step 604, after establishing the identity of the user, the electronic device acquires a request to access the data objects from the user. For example, as shown above, the request can be made via a sub-interface (e.g., interface 442 of interface 400). The request to access the data objects can be acquired by, for example, detecting a display of interface 442 of FIG. 4B and/or interface 542 of FIG. 5A, and/or detecting a pointer movement across or within interface 442 and/or interface 542.

In step 606, the electronic device acquires, in response to the request, data associated with an artifact that is configured to be displayed in interface 442. The artifact can include a collection of data used to facilitate a displaying of the data objects via interface 442. The representation can be graphical and/or textual. In some embodiments, the artifact can include, for example, an identifier for an application (e.g. application 312 of FIG. 3A) that provides the data objects, a list of data objects to be represented, and any other information pertinent to the graphical rendering of the data objects, such as shape and color of the graphical elements that represent the data objects, the co-ordinates of the graphical elements, the format of the graphical representation (e.g., depending on whether the map or the graph application is providing the data objects), the background, associated texts, etc., while a state of representation can be associated with a state of these information. The attributes of the graphical element (e.g., shape, color, etc.) of the data object can also be related to the data represented by the data object. The data associated with the artifact can be acquired from the document file, or from other data sources. For example, in instances where authentication of credentials is necessary, the graphical element may be acquired from data sources outside of the document file. The state of representation can be regarded as the first state of representation associated with a first timestamp.

In step 608, after acquiring the data associated with the artifact, the electronic device acquires the data being represented by the data objects from a second device, based on the artifact information. The data being represented by the data objects can include, for example, the data about a distribution of a pre-defined activity within a pre-defined radius around the locations associated with the data objects, as shown in FIG. 4A, or relationship between a group of people represented by the data objects, as shown in FIG. 5A. The data being represented by the data objects can also include one or more property types associated with the data objects, and the corresponding property values. The scope of the property data acquired can be based on the established identity of the user seeking to access the data objects according to step 602. In some embodiments, the data objects can have similar attribute as data object 363 of FIG. 3B, where the properties associated with the data objects can also be associated with one or more access control policies, specified in field 363e, governing access right to the properties by the user. The property data can then be pre-filtered based on the access control policies before it is acquired by the electronic device.

In step 610, the electronic device displays the artifact. Optionally, to facilitate the display, the electronic device modifies or generates additional data associated with a local display of the artifact at the electronic device. The additional data can include, for example, the display co-ordinates of the graphical elements, data supporting the graphical representation (e.g., depending on whether the map or the graph application is providing the data objects), the background, etc., that are customized for the display at the electronic device.

In step 612, the electronic device acquires an action from the user to manipulate the representation of the data objects. Such action can be detected via any pointer movement within, for example, interfaces 442 and 542, and include but is not limited to a selection of a data object, an action to move a graphical element representing the data object to a different location, an action to navigate and zoom into another portion of the representation, an action to invoke another application, and/or an action to open additional interface (e.g., interface 562 of FIG. 5B) for a separate representation of the same or other data objects. For example, the electronic device can detect an activation of data object 550 as shown in FIG. 5A by, for example, detecting a selection and/or "dragging" movement of data object 550 within interface 542. Such a movement may indicate that the user attempts to access the properties of data object 550 via a separate interface.

In step 614, the electronic device determines if the acquired action requests for additional data (e.g., additional sample data, additional data objects, invoking a different application, etc.). If the acquired action does not require additional data, the electronic device can carry out step 616 to simply update the state of representation of the currently-rendered data objects by providing, for example, updated graphics, co-ordinates information, etc. If the acquired action requires additional data (e.g. expanding of interface 442 to display a bigger map with more data objects as shown in FIG. 4D, launching of a new investigation as shown in FIG. 4E, etc.), the electronic device can carry out step 618 to request additional data represented by the data objects from the second device, and update the state of representation of the additional data objects and/or the currently-rendered data objects. The electronic device may also store the updated state as a second state of representation associated with the artifact. The second state of representation can be associated with a second timestamp. The electronic device may also receive an instruction to overwrite the first state with the second state.

In step 620, the electronic device displays the modified artifact.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed:

1. A non-transitory machine-readable storage medium, storing instructions which, when executed by at least one processor of a machine, cause the machine to perform operations comprising:
   receiving a selection of a geographical region;
   causing display of an artifact within a first interface at a first electronic device, the first electronic device associated with a first user, the artifact being defined by a first representation state that comprises a first visual depiction of one or more graphical elements representative of a set of data objects associated with the geographical region, and including an identifier of an application associated with the set of data objects, the one or more graphical elements displayed at locations within the first interface, the first interface comprising a depiction of the geographical region within a map image;
   receiving a user input from the first user through the first interface of the first electronic device, the user input moving a graphical element from among the one or more graphical elements from a first location in the map image to a second location in the map image;
   transmitting a first request to a second electronic device associated with the application identified by the identifier, for second data associated with at least the artifact and the second location of the graphical element within the map image, in response to the receiving the user input moving the graphical element from the first location to the second location;
   retrieving identification information of the first user in response to the first request for the second data associated with the artifact;
   identifying a portion of the second data based on the identification information of the first user; and
   altering the first visual depiction of the one or more data objects based on the portion of the second data.

2. The non-transitory machine-readable storage medium of claim 1, wherein the instructions cause the machine to perform operations further comprising:
   receiving a first indication, via the first interface, to alter the first visual depiction;
   responsive to the receiving of the first indication, generating the first request; and
   creating a second representation state representing the second visual depiction.

3. The non-transitory machine-readable storage medium of claim 1, wherein the second data includes data represented by the one or more data objects.

4. The non-transitory machine-readable storage medium of claim 1, wherein the instructions cause the machine to perform operations further comprising:
   acquiring a second indication, via the first interface, the second indication causing the machine to undo the altering of the first visual depiction; and
   responsive to the acquisition of the second indication, generating a second request to be sent to the second electronic device for third data associated with the artifact, wherein the third data allows the second visual depiction to be altered to the first visual depiction.

5. The non-transitory machine-readable storage medium of claim 1, wherein the one or more data objects are associated with one or more properties, and wherein the instructions cause the machine to perform operations further comprising:
   acquiring, via the first interface, a third indication to access at least part of the properties of at least one of the one or more data objects, and wherein the second data includes data associated with at least part of the properties.

6. The non-transitory machine-readable storage medium of claim 5, wherein the third indication causes the first electronic device to display a second interface, and wherein the at least part of the properties are represented via the second interface.

7. The non-transitory machine-readable storage medium of claim 5, wherein the properties are associated with one or more access control statuses, and wherein the second data is filtered based on the access control statuses before being acquired by the first electronic device.

8. The non-transitory machine-readable storage medium of claim 5, wherein the access control statuses are associated with an identity of a user receiving the representation via the first interface.

9. An apparatus interfacing with a storage device storing a file, the file comprising first data associated with an artifact configured to be displayed in a first interface at a first electronic device, the artifact including a first representation state representing a first visual depiction of one or more data objects, the apparatus comprising:
   a display device capable of rendering the first interface;
   a memory device configured to store a set of instructions; and at least one processor capable of executing the set of instructions to cause the apparatus to perform operations comprising:

receiving a selection of a geographical region:

causing display of an artifact within a first interface at a first electronic device, the first electronic device associated with a first user, the artifact being defined by a first representation state that comprises a first visual depiction of one or more graphical elements representative of a set of data objects associated with the geographical region, and including an identifier of an application associated with the set of data objects, the one or more graphical elements displayed at locations within the first interface, the first interface comprising a depiction of the geographical region within a map image;

receiving a user input from the first user through the first interface of the electronic device, the user input moving a graphical element from among the one or more graphical elements from a first location in the map image to a second location in the map image;

transmitting a first request to a remote electronic device for second data associated with at least the artifact and the second location of the graphical element within the map image, in response to the user input moving the graphical element, the request including an identifier of the first user;

retrieving identification information of the first user in response to the first request for the second data associated with the artifact;

retrieving a portion of the second data based on the identification information of the first user; and altering the first visual depiction of the one or more data objects based on the portion of the second data.

10. The apparatus of claim 9, wherein the at least one processor is also capable of executing the set of instructions to cause the apparatus to:

acquire a first indication, via the first interface, to alter the first visual depiction;

responsive to acquisition of the first indication, transmit the first request and create a second representation state representing the second visual depiction.

11. The apparatus of claim 9, wherein the second data includes data represented by the one or more data objects.

12. The apparatus of claim 9, wherein the at least one processor is capable of executing the set of instructions to cause the apparatus to:

acquire a second indication, via the first interface, to undo the altering of the first visual depiction; and responsive to acquisition of the second indication, transmit a second request to the second electronic device for third data associated with the artifact, wherein the third data allows the second visual depiction to be altered to the first visual depiction.

13. The apparatus of claim 9, wherein the one or more data objects are associated with one or more properties, and wherein the at least one processor is also capable of executing the set of instructions to cause the apparatus to:

acquire a third indication, via the first interface, to access at least part of the properties of at least one of the one or more data objects; and responsive to acquisition of the third indication, represent the at least part of the properties.

14. The apparatus of claim 13, wherein the properties are associated with one or more access control statuses, and wherein the second data is filtered based on the access control statuses before being acquired by the apparatus.

15. A computer-implemented method of providing access, via a first interface at a first electronic device, the method comprising:

receiving a selection of a geographical region;

causing display of an artifact within a first interface at a first electronic device, the first electronic device associated with a first user, the artifact being defined by a first representation state that comprises a first visual depiction of one or more graphical elements representative of a set of data objects associated with the geographical region, and including an identifier of an application associated with the set of data objects, the one or more graphical elements displayed at locations within the first interface, the first interface comprising a depiction of the geographical region within a map image;

receiving a user input from the first user through the first interface of the first electronic device, the user input moving a graphical element from among the one or more graphical elements from a first location in the map image to a second location in the map image;

transmitting a first request to a second electronic device for second data associated with at least the artifact and the second location of the graphical element within the map image, in response to the receiving the user input moving the graphical element;

retrieving identification information of the first user in response to the first request for the second data associated with the artifact;

retrieving a portion of the second data based on the identification information of the first user; and altering the first visual depiction of the one or more data objects based on the portion of the second data.

16. The method of claim 15, further comprising:

acquiring a first indication, via the first interface, to alter the first visual depiction;

responsive to acquiring the first indication, transmitting the first request and creating a second representation state representing the second visual depiction.

17. The method of claim 15, wherein the second data includes data represented by the one or more data objects.

18. The method of claim 15, further comprising:

acquiring a second indication, via the first interface, to undo the altering of the first visual depiction; and responsive to acquiring the second indication, transmitting a second request to the second electronic device for third data associated with the artifact, wherein the third data allows the second visual depiction to be altered to the first visual depiction.

19. The method of claim 15, wherein the one or more data objects are associated with one or more properties, further comprising:

acquiring a third indication, via the first interface, to access at least part of the properties of at least one of the one or more data objects; and responsive to acquisition of the third indication, representing the at least part of the properties.

20. The method of claim 19, wherein the properties are associated with one or more access control statuses, and wherein the second data is filtered based on the access control statuses before being acquired.

* * * * *